(12) United States Patent
Matama

(10) Patent No.: US 6,751,349 B2
(45) Date of Patent: Jun. 15, 2004

(54) IMAGE PROCESSING SYSTEM

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 685 days.

(21) Appl. No.: 09/725,842

(22) Filed: Nov. 30, 2000

(65) Prior Publication Data
US 2002/0003630 A1 Jan. 10, 2002

(30) Foreign Application Priority Data

Nov. 30, 1999 (JP) .......................................... 11-340581
Nov. 30, 1999 (JP) .......................................... 11-340582
Nov. 30, 1999 (JP) .......................................... 11-340583

(51) Int. Cl.$^7$ ................................................. G06K 9/00
(52) U.S. Cl. ...................................... 382/167; 358/302
(58) Field of Search .............................. 382/162, 167, 382/299, 312, 274; 358/302, 518; 399/178, 179, 184; 359/350

(56) References Cited

U.S. PATENT DOCUMENTS 5,649,269 A * 7/1997 Doi et al. .................... 399/178
5,669,031 A * 9/1997 Ishikawa et al. ............. 396/569
6,597,428 B1 * 7/2003 Adachi et al. ................. 355/40

FOREIGN PATENT DOCUMENTS

EP      0 610 994 A2    8/1994    ............ G03C/7/30
JP      6-295035        10/1994   ............ G03C/7/00

* cited by examiner

Primary Examiner—Phuoc Tran
(74) Attorney, Agent, or Firm—Sughrue Mion, PLLC

(57) ABSTRACT

An image processing system includes a reference exposure section, a developing section, a film scanner, and an image processing apparatus. The reference exposure part carries out reference exposure by R light, G light, B light and gray light, by using an unexposed area of a photographic film as a reference exposure area, in order to form image information to be used for determining image processing conditions. The film scanner reads the reference exposure area developed by the developing section. A control section of the image processing apparatus calculates the image processing conditions, such as color correction conditions, from read data of the reference exposure area. An image processing section carries out image processing of frame images recorded on the photographic film, according to calculated image processing conditions.

21 Claims, 30 Drawing Sheets

F I G. 9
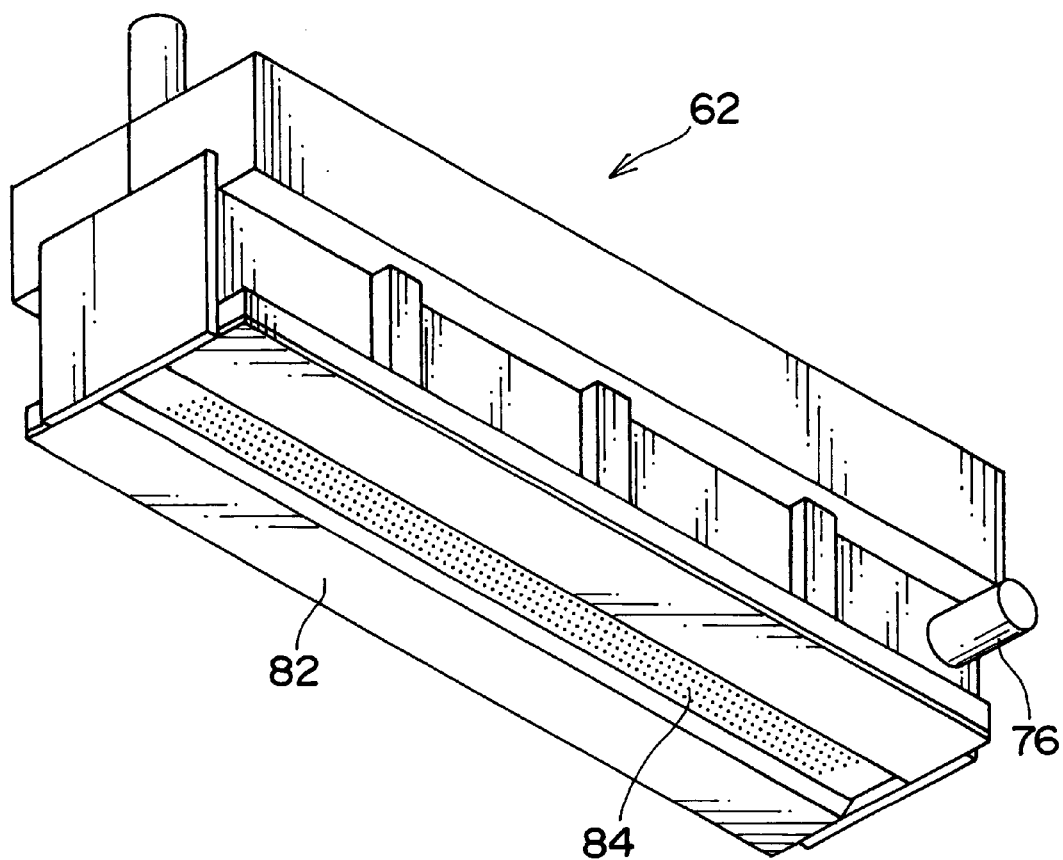

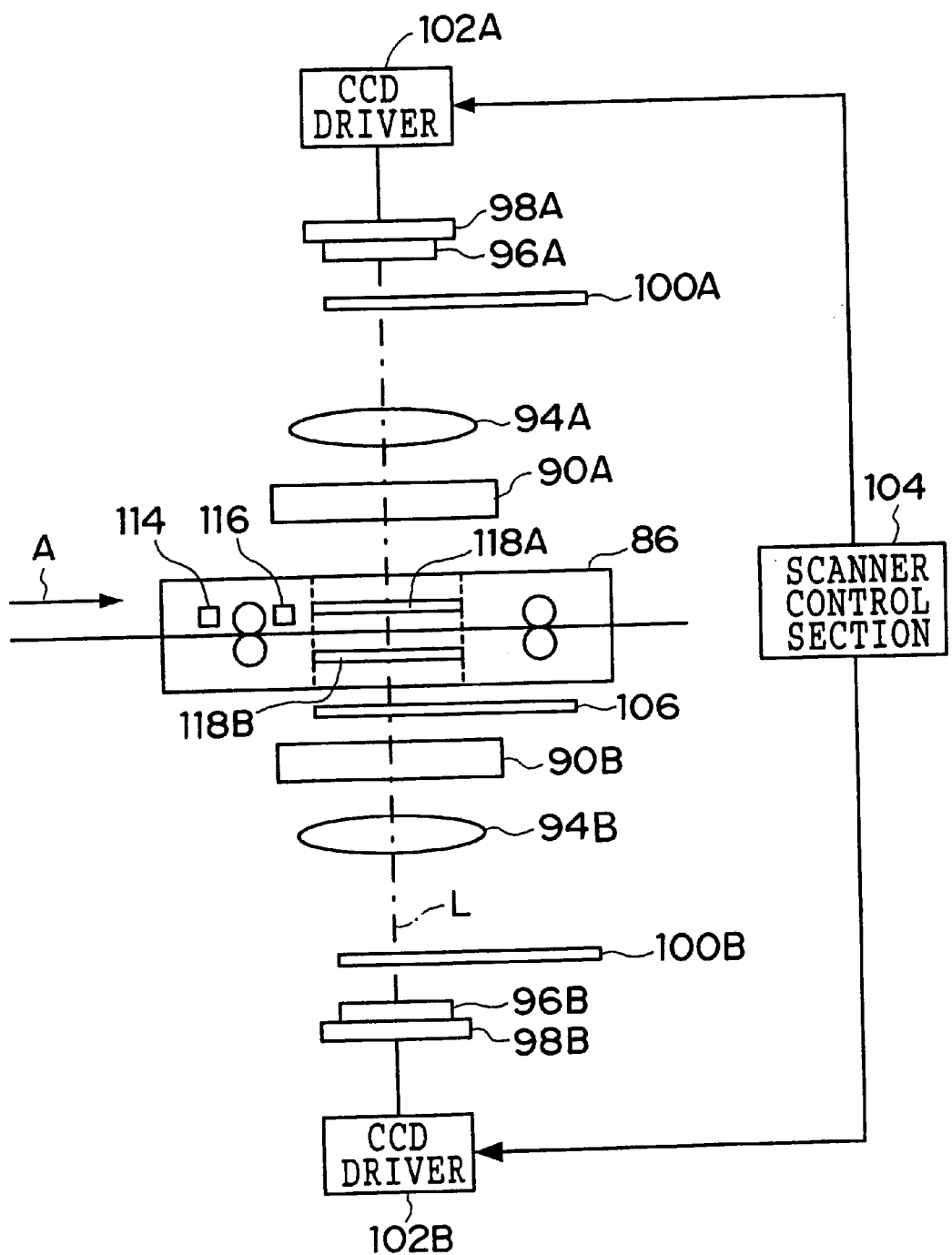
F I G. 1 1

F I G. 1 3
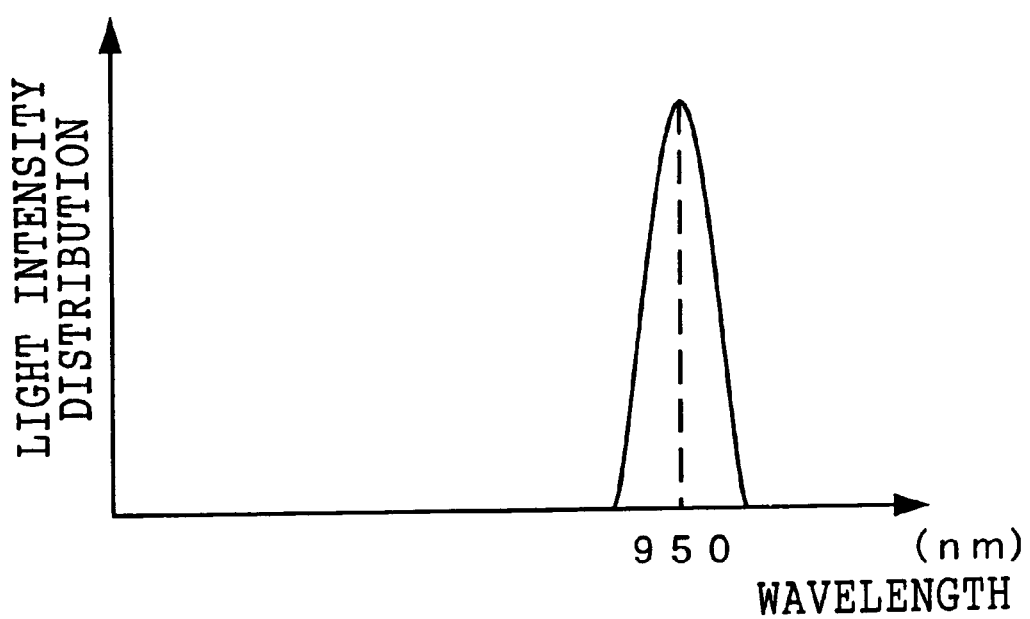

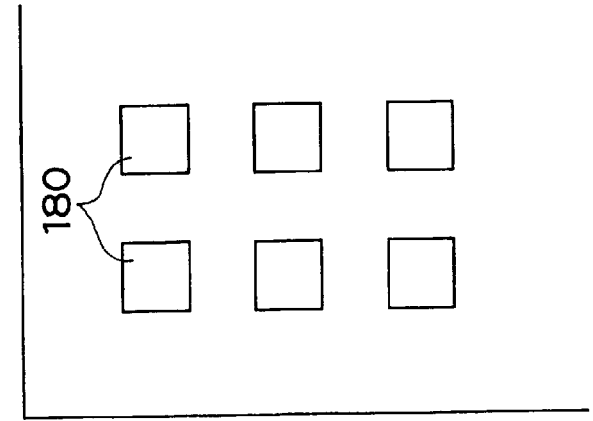
F I G. 24 A
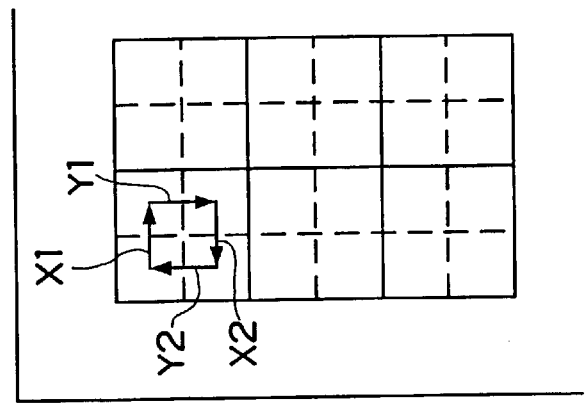
F I G. 24 B
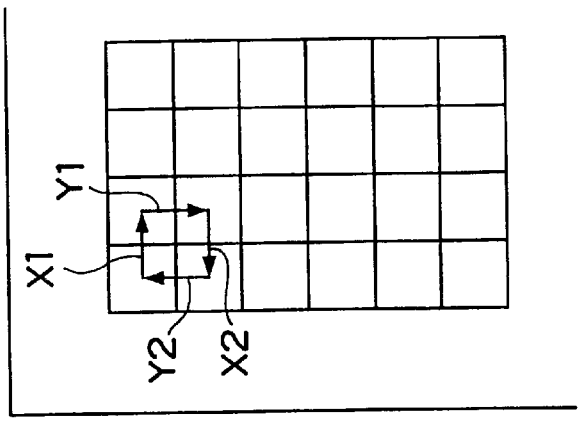
F I G. 24 C

F I G. 2 5
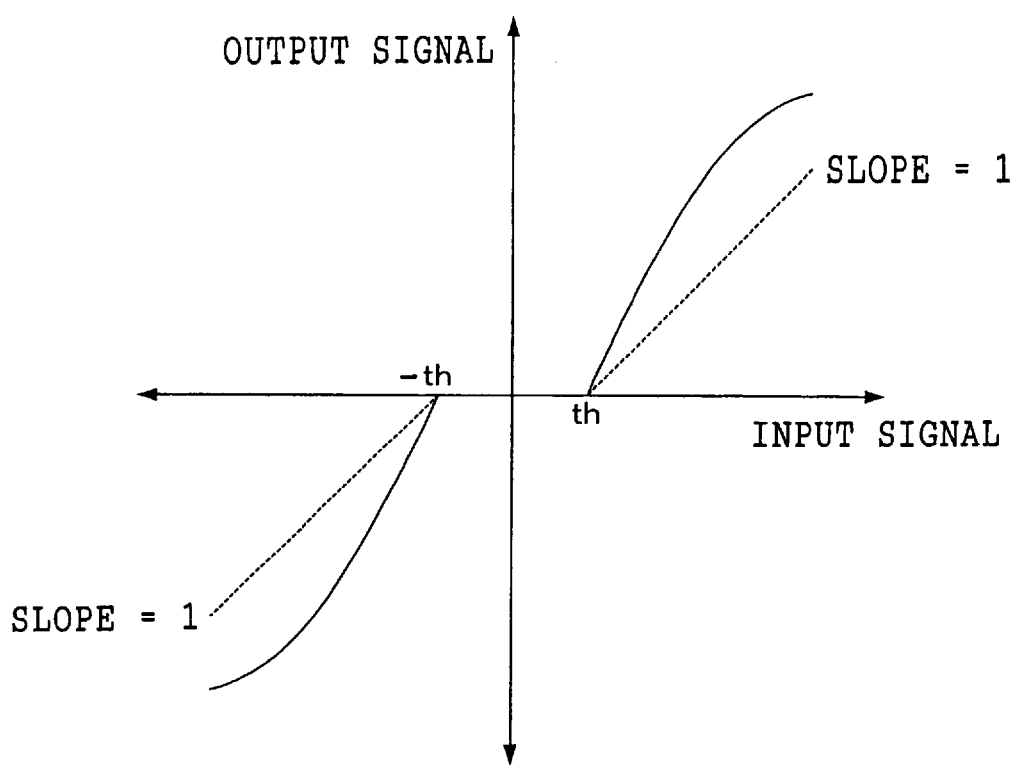

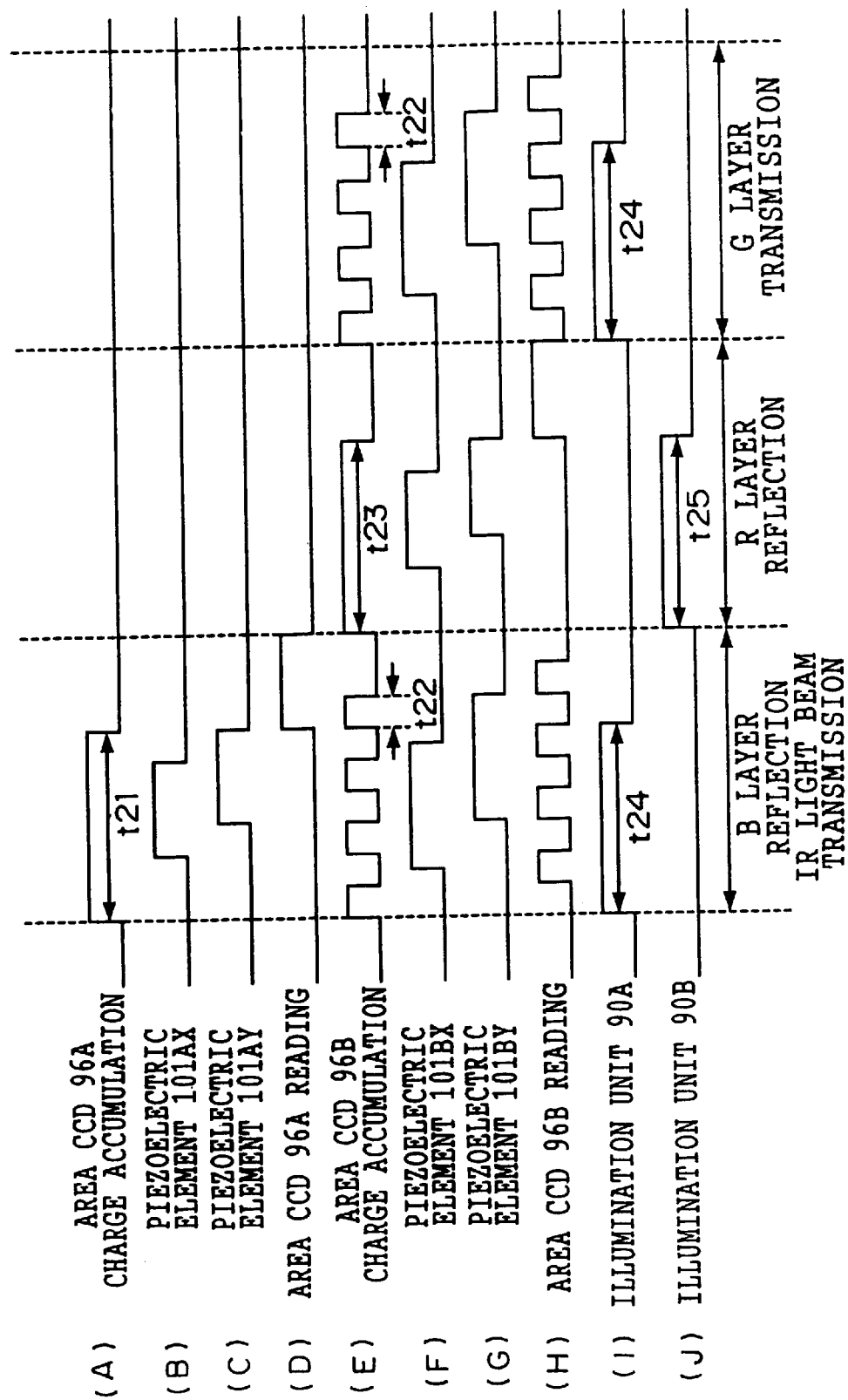

IMAGE PROCESSING SYSTEM

BACKGROUND OF THE INVENTION

1. Field of the Invention

The present invention relates to an image processing apparatus, and in particular, to an image processing system for executing image processings of an image recorded on a color photographic film after development.

2. Description of the Related Art

Color photographic films, such as a color negative film or a color reversal film, comprise a blue-light-photosensitive layer for forming a yellow dye image due to blue light exposure, a green-light-photosensitive layer for forming a magenta dye image due to green light exposure, and a red-light-photosensitive layer for forming a cyan dye image due to red light exposure.

At the time of photographic processing of a color negative film, a developer is oxidized in the process of reducing silver halide particles containing a latent image into silver, and a dye image is formed by coupling of the oxidized developer and a dye-forming coupler. Conventionally, undeveloped silver halide is eliminated in a fixing process, or an undesirable developed silver image is eliminated in a bleaching process.

Recently, convenience in such photographic processing of a color negative film has been called for more and more strongly. For example, Japanese Patent Application Laid-Open (JP-A) No. 6-295035 discloses an image forming method for extracting the image information representing image wise exposure for each of the red (R), green (G), and blue (B) color parts from a silver halide color photograph element, that is, from a silver image, without forming a dye image by the black and white development of a color photographic film.

However, an ordinary color photographic film is designed so as to have an image with appropriate color gradation R, G, B transmission densities at the time of normal development. That is, a color photographic film is designed for providing a dye image appropriately, and is not designed for appropriately providing a silver image, which is not to be used originally for image information. Thus, in the case in which a color photographic film is subjected to black and white development or to color development and a silver image or a color image is read, appropriate color reproduction and gradation reproduction are not possible.

Moreover, since the ratio of the dye image and the developed silver differs depending on the type of the film, the exposure level, and the like, the read images cannot be corrected uniformly.

Furthermore, since the reflection density and the transmission density are in a non-linear relationship, in a case in which both reflection reading and transmission reading are used, the gray balance cannot be corrected by a simple correction.

Moreover, the problem of color mixing occurs in the reflection reading due to the influence by the lower layers. Since the extent thereof differs depending on the type of the film, the color mixing cannot be corrected uniformly.

Furthermore, since the concentration of unnecessary substances remaining in a color photographic film after black and white development, the concentration of the silver halide, and the concentration of the anti-halation layer produced by the colloid silver differ in accordance with the type of the film, they cannot be corrected uniformly.

A silver image can be obtained by irradiating a light beam from the front side and the back side of a color negative film, and detecting the light reflected from and the light transmitted through the front side (emulsion surface side) of the color negative film and the back side (base surface side thereof).

However, unlike color paper, an ordinary color photographic film does not contain a layer including titanium oxide or the like having a high reflectance, and thus ordinary color photographic film cannot reflect light efficiently. Therefore, in order to read an image with a high S/N (signal/noise) ratio, a large amount of light should be irradiated onto the film. In particular, in the case of reading reflected light from the base surface side, since the anti-halation layer comprising a colloid silver attenuates the light, an even larger amount of light should be irradiated.

However, in the case in which a large amount of light is irradiated, heat may be generated so as to deform or damage the film, and thus, the amount of irradiated light cannot be increased. Moreover, as compared with a case of reading transmitted light, in reading reflected light, generation of flare and deterioration of sharpness due to the multiple reflections in the layers are conspicuous. Furthermore, the sharpness is deteriorated also due to the color offset caused by the positional offset between a sensor for reading out the reflected light and a sensor for reading out the transmitted light.

Moreover, in this case, the silver image information of the intermediate layer can be obtained by subtracting the silver image information based on the light reflected from the front side and the back side of the color negative film, from the silver image information based on the light transmitted through the color negative film.

However, since the image information of the intermediate layer is obtained by subtracting the silver image information based on the light reflected from the front side and the back side of the color photographic film from the silver image information based on the light transmitted through the color photographic film, appropriate color reproduction is even more difficult to achieve.

SUMMARY OF THE INVENTION

The present invention was developed in order to solve the above-mentioned problems, and an object of the present invention is to provide an image processing system capable of appropriately reproducing the color and the gradation of an image recorded on a color photographic film which has been subjected to black and white development.

Moreover, another object of the present invention is to provide an image processing system capable of preventing deterioration of sharpness even in cases in which an image is obtained by reflected light and transmitted light of light irradiated onto a color photographic film.

Furthermore, still another object of the present invention is to provide an image processing system capable of appropriately obtaining image information of an intermediate layer even in cases in which image information is obtained by reflected light and transmitted light of light irradiated onto a color photographic film.

A first aspect of the present invention is an image processing system for carrying out image processing on an image recorded on a color photographic photosensitive material which has at least three kinds of photographic photosensitive layers containing blue-light-photosensitive, green-light-photosensitive, and red-light-photosensitive silver halide emulsions on a light transmissible supporting member, and which is processed such that a silver image is generated in the photographic photosensitive layers after exposure of an image, said image processing system comprising: a light source for irradiating light to a front side and a back side of the color photographic photosensitive material; a reading sensor for reading image information by light reflected from the front side and the back side of the color photographic photosensitive material, and light transmitted through the color photographic photosensitive material; an exposing device for exposing a predetermined unexposed area of the color photographic photosensitive material by each blue, green, and red light; a calculating device for determining correction conditions for correcting image information of each color on the basis of the lights reflected from the front side and the back side of the color photographic photosensitive material in an area exposed by each color and the light transmitted through color photographic photosensitive material; and a correcting device for correcting a read image in accordance with the correction conditions.

The color photographic photosensitive material has at least three types of photographic photosensitive layers containing blue-light-photosensitive, green-light-photosensitive, and red-light-photosensitive silver halide emulsions on a transparent supporting member. After exposing a photographed image on such a color photographic photosensitive material, a black and white developing process or a color developing process is carried out so as to produce a silver image in each photographic photosensitive layer. A light source irradiates a light onto the front side and the back side of the color photographic photosensitive material at which the silver images have been formed. As the light source, a light source comprising LED for irradiating light of a wavelength to be reflected by the silver image, such as light of a wavelength in the infrared region (IR light), can be used.

The reading sensor reads the image information based on light which is reflected or transmitted from the front side and the back side of the color photographic photosensitive material by irradiating the color photographic photosensitive material with light emitted from the light source. That is, in the case of a color photographic photosensitive material a the blue-light-photosensitive (B) layer, a green-light-photosensitive (G) layer, and a red-light-photosensitive (R) layer laminated in this order, the image of the B layer is read by light reflected by a silver image of the blue-light-photosensitive layer, and the image of the R layer is read by light reflected by a silver image of the red-light-photosensitive layer. The image of the G layer can be obtained by subtracting the image of the R layer and the image of the B layer from the image of the total three layers based on the transmitted light.

The reading sensor may be formed by a front side low resolution sensor for reading, at a low resolution, reflected image information based on light reflected from the front side of the color photographic photosensitive material; a back side low resolution sensor for reading, at a high resolution, reflected image information based on light reflected from the back side of the color photographic photosensitive material; and a high resolution sensor for reading, at a high resolution, transmitted image information based on light transmitted through the color photographic photosensitive material.

Moreover, the reading sensor may be formed by a common sensor for reading, at a low resolution reflected image information based on reflected from one of the front side and the back side of color photographic photosensitive material, and for reading, at a high resolution, transmitted image information based on light transmitted through the color photographic photosensitive material; and a low resolution sensor for reading, at a low resolution, reflected image information based on a light beam reflected by another of the front side and the back side of the color photographic photosensitive material. By providing the sensor for reading the reflected image information and the transmitted image information as a common sensor, the apparatus can be simplified so as to reduce the cost.

As the low resolution sensor, the high resolution sensor, and the common sensor, for example, an area CCD capable of reading out a frame image of a color photographic photosensitive material at one time or a line CCD capable of reading out an image one line at a time can be used.

The exposing device exposes a predetermined unexposed area of a color photographic photosensitive material by each of blue, green, and red colors, and preferably effects single color exposure (reference exposure) from a low density range to a high density range for each color. As the exposing device, for example, a light source with LEDs for emitting light beams corresponding to each of blue, green and red colors disposed according to a predetermined exposure pattern can be used.

Since the reflected light of the light irradiated onto the front side and the back side of a color photographic photosensitive material is influenced by a lower layer, an appropriate color reproduction cannot be executed as it is.

Therefore, the calculating device calculates correction conditions for correcting, for example, color mixing of the respective colors. Namely, the calculating device determines correction conditions for correcting the image information of each color, on the basis of light reflected from the front side and the back side of the color photographic photosensitive material in the area exposed by each color, and light transmitted through the color photographic photosensitive material. For example, since the R layer is influenced by the B layer and the G layer, color mixing occurs. However, by determining the R layer density and the B layer density in the area single color exposed by G color, the degree of color mixing of the G color in the R layer and the B layer can be obtained. Accordingly, by determining the density of each layer in each single color exposure area, the degree of color mixing in each layer can be known. Therefore, the calculating means determines the density of each color in each single color exposure area, and sets the correction conditions so as to eliminate color mixing in each layer, from the determined density values of each layer in each single color exposure area.

The correcting device corrects the read image according to the correction conditions determined as described above. Accordingly, even in the case of reading out an image recorded on a color photographic photosensitive material which has been processed so as to produce a silver image, color reproduction and gradation reproduction can be realized appropriately regardless of the type of the color photographic photosensitive material, the passage of time, or changes in the developing conditions.

Moreover, the reflection density and the transmission density have, in general, anon-linear relationship. Therefore, in the case of an image in which both reflection density obtained by reflected light and transmission density obtained by transmitted light exist, even if the densities are combined, color reproduction and gradation reproduction may not be carried out appropriately.

Therefore, it is preferable that the calculating device converts the reflection densities obtained by the light reflected by the front side and the rear side of the color photographic photosensitive material to transmission densities. That is, for example, from the reflected light and the transmitted light of the R layer in the R single color exposure area, the conversion characteristics for converting from the reflection density to the transmission density can be determined. Similarly, from the reflected light and the transmitted light of the B layer in the B single color exposure area, the conversion characteristics for converting from the reflection density to the transmission density can be determined. Therefore, by converting the reflection density to the transmission density using the conversion characteristics and by determining the correction conditions on the basis of the transmission densities of the respective layers, even more appropriate color reproduction and gradation reproduction can be realized.

A color photographic film is designed such that a good characteristic can be obtained in the case of normal color developing. In contrast, when a color photographic film which has been subjected to black-and-white development is read by light which is reflected from the front side and the rear surface or light which has passed through the film, there is non-linearity in the characteristic due to various reasons. Specifically, there is non-linearity because the relationship between the reflection density and the transmission density is non-linear as described above, and because the ratio of the concentration of the coloring material and the concentration of silver is not constant.

Thus, in the present invention, the exposing device carries out gray exposure on the predetermined unexposed area of the color photographic photosensitive material, the calculating device further determines the correction conditions for correcting gray balance and contrast based on the light reflected from the front side and the back side of the color photographic photosensitive material and the light transmitted through the color photographic photosensitive material, and the correcting device carries out at least one of non-linearity correction of the read image, gray balance correction of the read image, and contrast correction of the read image in accordance with the correction conditions.

A second aspect of the present invention is an image processing system for carrying out image processing on an image recorded on a color photographic photosensitive material which has at least three types of photographic photosensitive layers containing blue-light-photosensitive, green-light-photosensitive, and red-light-photosensitive silver halide emulsions on a light transmissible supporting member, and which is processed such that a silver image is generated the photographic photosensitive layers after exposure of an image, said image processing system comprising: a light source for irradiating light onto a front side and a back side of the color photographic photosensitive material, and a reading sensor for reading, at a low resolution, reflected image information based on lights reflected from the front side and the back side of the color photographic photosensitive material, and for reading, at a high resolution, image information based on a light transmitted through the color photographic photosensitive material.

The color photographic photosensitive material comprises at least three types of photographic photosensitive layers containing blue-light-photosensitive (B), green-light-photosensitive (G), and red-light-photosensitive (R) silver halide emulsions on a transparent supporting member. After exposing a photographed image on such a color photographic photosensitive material, a black and white developing process or a color developing process is carried out so as to produce a silver image in each photographic photosensitive layer.

A light source irradiates light onto the front side and the back side of the color photographic photosensitive material on which the silver images have been formed. As the light source, a light source comprising LEDs for irradiating light of a wavelength to be reflected by a silver image, such as light of a wavelength in the infrared region (IR light), can be used. Furthermore, in a case in which the color photographic photosensitive material is subjected to color development, a light source comprising LEDs for irradiating light of a wavelength to be reflected by a dye image formed on each layer, that is, R light, G light, or B light, can be used.

The reading sensor reads, at a low resolution for example, the reflected image information based on light which is from the light source and which is reflected by the front side and the back side of the color photographic photosensitive material. Moreover, the reading sensor reads, at a high resolution for example, the transmitted image information based on transmitted light which is from the light source and which is transmitted through the color photographic photosensitive material. That is, in the case of a color photographic photosensitive material with a blue-light-photosensitive layer, a green-light-photosensitive layer, and a red-light-photosensitive layer laminated in this order, the B image information is read by the reading sensor light reflected by a silver image of the blue-light-photosensitive layer, and the R image information is read by the reading sensor by light reflected by silver image of the red-light-photosensitive layer. The G image information can be obtained by subtracting the R image and the B image from the image information of the total three layers based on the transmitted light read by the reading sensor.

The reading sensor may be formed by a front side low resolution sensor for reading, at a low resolution, reflected image reflected image information based on light reflected from the front side of the color photographic photosensitive material; a back side low resolution sensor for reading, at a low resolution, reflected image information based on light reflected from the back side low resolution sensor for reading, at a low resolution, reflected image information based on light reflected form the back side of the color photographic photosensitive material; and a high resolution sensor for reading, at a high resolution transmitted image information based on light transmitted through the color photographic photosensitive material.

Moreover, the reading sensor may be formed by a common sensor for reading, at a low resolution, reflected image information based on light reflected form one of the front side and the back side of the color photographic photosensitive material, and for reading, at a high resolution, transmitted image information based on light transmitted through the color photographic photosensitive material; and a low resolution sensor for reading, at a low resolution, reflected image information based on a light beam reflected by another of the front side and the back side of the color photographic photosensitive material. By providing the sensor for reading out the reflected image information and the transmitted image information as a common sensor, the apparatus can be simplified so as to reduce the cost.

As the low resolution sensor, the high resolution sensor, and the common sensor, for example, an area CCD capable of reading out a frame image of a color photographic photosensitive material at one time or a line CCD capable of reading out an image one line at a time can be used.

Moreover, reading at a low resolution can be realized by moving the reading sensor in a predetermined direction during the photoelectric conversion by the photoelectric conversion elements by a moving means, in a case in which a plurality of photoelectric conversion elements are included in the reading sensor for the photoelectric conversion of reflected light.

That is, in the case the reading sensor includes a plurality of the photoelectric conversion elements for the photoelectric conversion of reflected light, such as photodiodes, and there are gaps between adjacent photoelectric conversion elements, the moving means moves the photoelectric conversion elements in the vertical direction and the lateral direction so as to detect the light irradiated onto these gaps. Accordingly, although the resolution is lowered, there is no need to increase the amount of light to be irradiated, even in the case of the reflection reading.

Furthermore, by executing the reading during moving and not during charge accumulation, high resolution reading can be realized. Therefore, the same sensor can serve as a reading sensor for both transmitted light and reflected light.

Moreover, low resolution reading can be carried out by combining the outputs from the adjacent photoelectric conversion elements.

By combining the outputs from the adjacent photoelectric conversion elements, although the resolution is lowered, the sensitivity can be improved apparently, so that even in the case of reflection reading, there is no need to increase the amount of light which is irradiated.

A third aspect of the present invention is an image processing system for carrying out image processing on an image recorded on a color photographic photosensitive material which has at least three types of photographic photosensitive layers containing blue-light-photosensitive, green-light-photosensitive, and red-light-photosensitive silver halide emulsions on a light transmissible supporting member, and which is processed such that an image including a silver image and a dye image is generated in the photographic photosensitive layers after exposure of an image, said image processing system comprising: a first light source for irradiating an infrared light onto the color photographic photosensitive material such that the infrared light is transmitted through the photographic photosensitive layer of an intermediate layer; a second light source for irradiating, onto the color photographic photosensitive layer, of a color complementary to the dye contained in the image in the photographic photosensitive layer of the intermediate layer such that the complementary color light is transmitted through the intermediate layer; a reading sensor for reading first transmitted image information based on the infrared light transmitted through the color photographic photosensitive material, as well as second transmitted image information based on the complementary color light transmitted through the color photographic photosensitive material; and a calculating device for obtaining image information of the intermediate layer by calculation using the second transmitted image information and the first transmitted image information.

A color photographic photosensitive material has at least three types of photographic photosensitive layers containing blue-light-photosensitive (B), green-light-photosensitive(G) and red-light-photosensitive (R) silver halide emulsions on a transparent supporting member. After exposing a photographed image on such a color photographic photosensitive material, a color developing process is carried out so as to produce, a silver image in each photographic photosensitive layer, an image including a silver image and a dye image.

The first light source irradiates infrared light (IR light) onto the emulsion surface side or the supporting member side of the color photographic photosensitive material such that the light is transmitted through the intermediate the photographic photosensitive layer. As the light source a light source formed by LEDs for irradiating IR light can be used. In the case of a color photographic photosensitive material with a blue-light-photosensitive layer, a green-light-photosensitive layer, a red-light-photosensitive layer, and a supporting member laminated in that order, the upper layer is the blue-light-photosensitive layer, the intermediate layer is the green-light-photosensitive layer, and the lower layer is the red-light-photosensitive layer.

A second light source irradiates, on the color photographic photosensitive material, complementary color light of a color complementary to the dye contained in the image in the photographic photosensitive layer of the intermediate layer, such that the complementary color lights is transmitted through the intermediate layer. For example, G light, which is complementary color light to the magenta dye contained in the green layer which is the intermediate layer, is irradiated.

The reading sensor reads the first transmitted image information based on the infrared light transmitted through the color photographic photosensitive material, as well as reads the second transmitted image information based on the complementary color light transmitted through the color photographic photosensitive material. In a case in which the first light source irradiates IR light and the second light source irradiates G light, the reading sensor can read out the information of the silver image of the total of the three layers based on the transmitted IR light, and can read the dye image of the intermediate layer, (that is, the green-light-photosensitive layer) based on the transmitted G light, and the silver image information of the total of the three layers. As the reading sensor, for example, an area CCD capable of reading out a frame image of the color photographic photosensitive material at one time or a line CCD capable of reading out an image one line at a time can be used.

The calculating means obtains the image information of the intermediate layer (green-light-photosensitive layer), that is, the G image information, by calculation of the second transmitted image information (that is, information of the dye image of the green-light-photosensitive layer), and the silver image information of the total of the three layers, and the first transmitted image information. For example, by subtracting the first transmitted image information from the second transmitted image information, the G image information can be obtained. Since the G image information comprises only the dye image information, as compared with the case of the information comprising only the silver image, information can be obtained with a high accuracy.

BRIEF DESCRIPTION OF THE DRAWINGS

FIG. 9 is a perspective view of a spray tank.

FIG. 11 is a schematic structural view of a film scanner.

FIG. 13 is a graph showing the wavelength of a irradiated light.

FIGS. 24A to 24C are diagrams for explaining pixel displacement of an area CCD.

FIG. 25 is a graph showing the relationship between an input signal and an output signal when sharpness enhancement is carried out in the second and third embodiments of the present invention.

FIG. 30 is a timing chart showing the image reading timing according to the third embodiment of the present invention.

DESCRIPTION OF THE PREFERRED EMBODIMENTS

Hereinafter, embodiments of the present invention used in an image reading apparatus for reading out a silver image recorded on the color photographic film before or after drying, after carrying out black and white development on the color photographic film so as to produce a silver image not including dye information, development, bleaching, fixation, and drying without washing with water, will be explained. In the case of the black and white development, a light source of various types of wavelengths including red light (R light), green light (G light), and blue light (B light) can be used, but in the embodiments, the case of reading a silver image using an infrared light (IR light) will be explained. In the case of reading an image in a state in which the development has not stopped or during the development, if R, G or B light is used, a problem of exposure of the silver halide by the reading light is generated. However, if IR light is used, this problem can be avoided.

Figure 1:
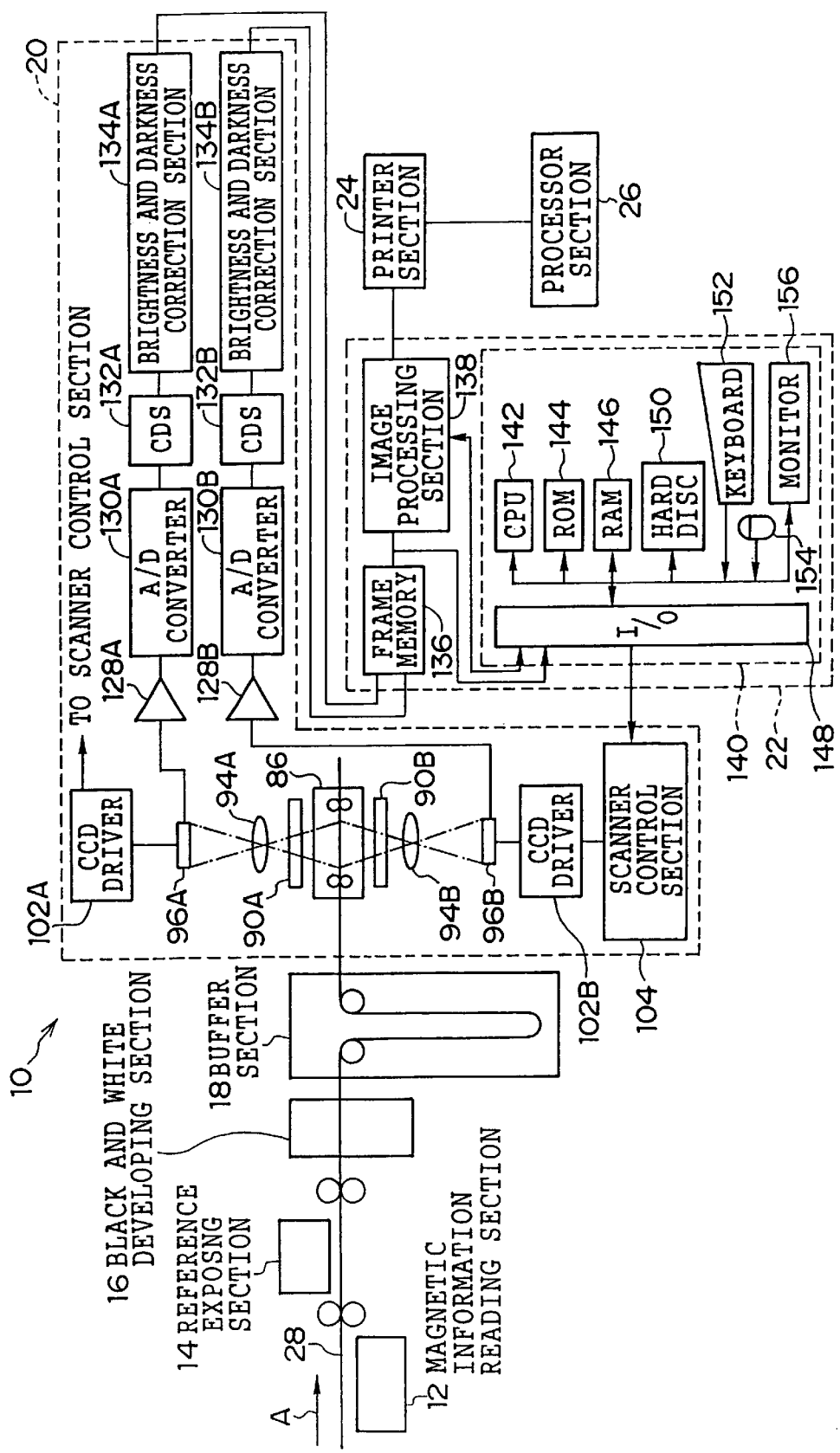
FIG. 1 is an overall structural view of an image processing system according to first and second embodiments of the present invention.

FIG. 1 shows the entire configuration of an image processing system 10. As shown in FIG. 1, the image processing system 10 comprises a magnetic information reading section 12, a reference exposure section 14, a black and white developing section 16, a buffer section 18, a film scanner 20, an image processing apparatus 22, a printer section 24, and a processor section 26.

The image processing system 10 is for reading out the film image (silver image) recorded on a color photographic film such as a negative film, and a reversal film (positive film), carrying out image processing thereon, and printing the image after the image processing on a printing paper. For example, a film image of a 135 size photographic film, a 110 size photographic film, a photographic film with a transparent magnetic layer formed (240 size photographic film: so-called APS film), 120 size and 220 size (Brownie size) photographic film, can be the object of processing. A photographic film 28 is conveyed in the arrow A direction in FIG. 1 with the emulsion surface side (B photosensitive layer side) upward. In the image processing system, an image may be formed on a heat sensitive paper by heat, or on a recording medium such as an ordinary paper by xerography or by an ink-jet.

Figure 2:
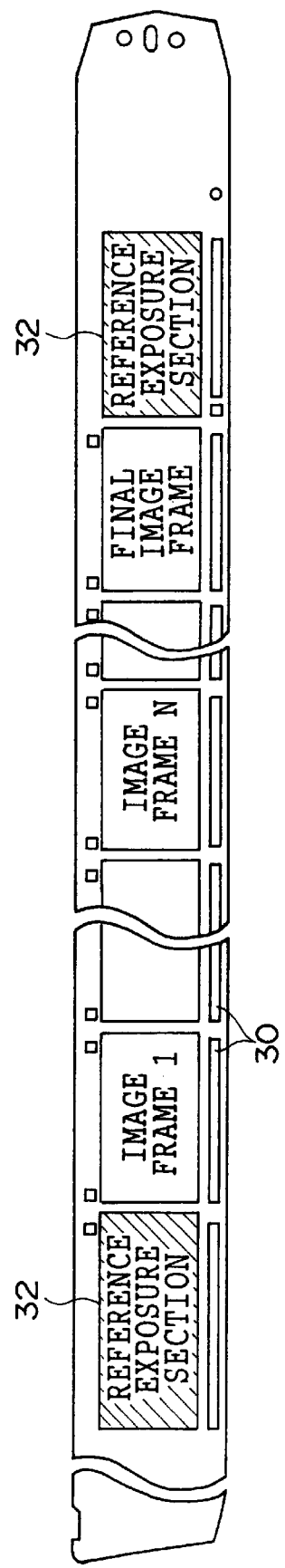
FIG. 2 is a plan view of an APS film.

The magnetic information reading section 12 is used for reading the magnetic information recorded in a magnetic layer formed below an image frame of the APS film 28A in the case the photographic film 28 which is the object of processing is an APS film as shown in FIG. 2. The magnetic information includes, for example, film sensitivity information, and information related to the type of the film, such as the DX code.

Figure 3:
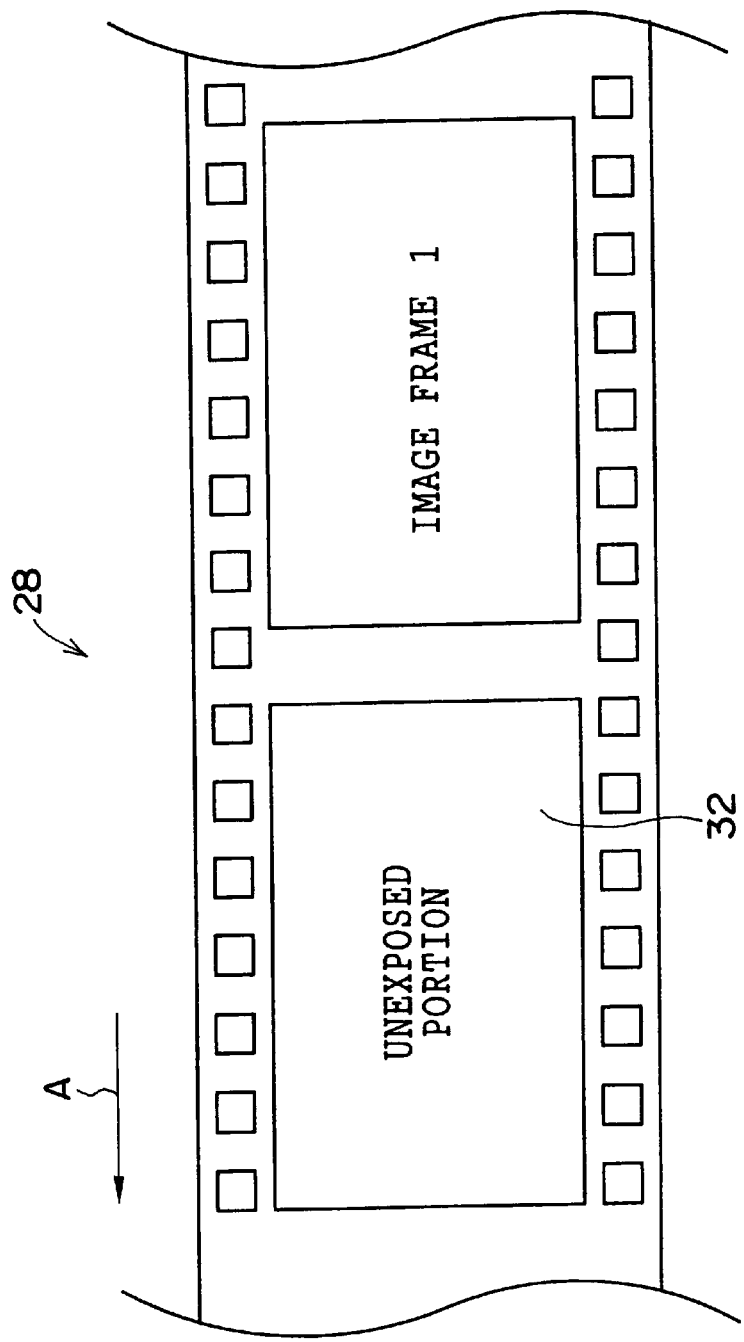
FIG. 3 is a plan view of a 135 film.

Moreover, as shown in FIG. 2, an unexposed area to be used freely by a user is provided at the leading end side and the trailing end side of the APS film 28A. In the present embodiment, the unexposed area at used as a reference exposure area 32. Moreover, in the case the photographic film 28 is a 135 size photographic film, an unexposed area existing at the leading end side or the trailing end side of the film as shown in FIG. 3 is used as the reference exposure area 32.

The reference exposure section 14 carries out reference exposure on the reference exposure area 32 for forming image information to be used at the time of determining the image processing conditions. Although it is possible to store the data obtained by reading out the image frames and reading out the image information of the reference exposure area 32 after reading out all of the image frames and then to determine the image processing conditions, since the image processing can be carried while reading out the image frames by determining the image processing conditions before reading out the image frames, it is preferable to carry out reference exposure on the reference exposure area 32 at the leading end side of the photographic film 28 for determining the image processing conditions before reading out the image frames.

Figure 4:
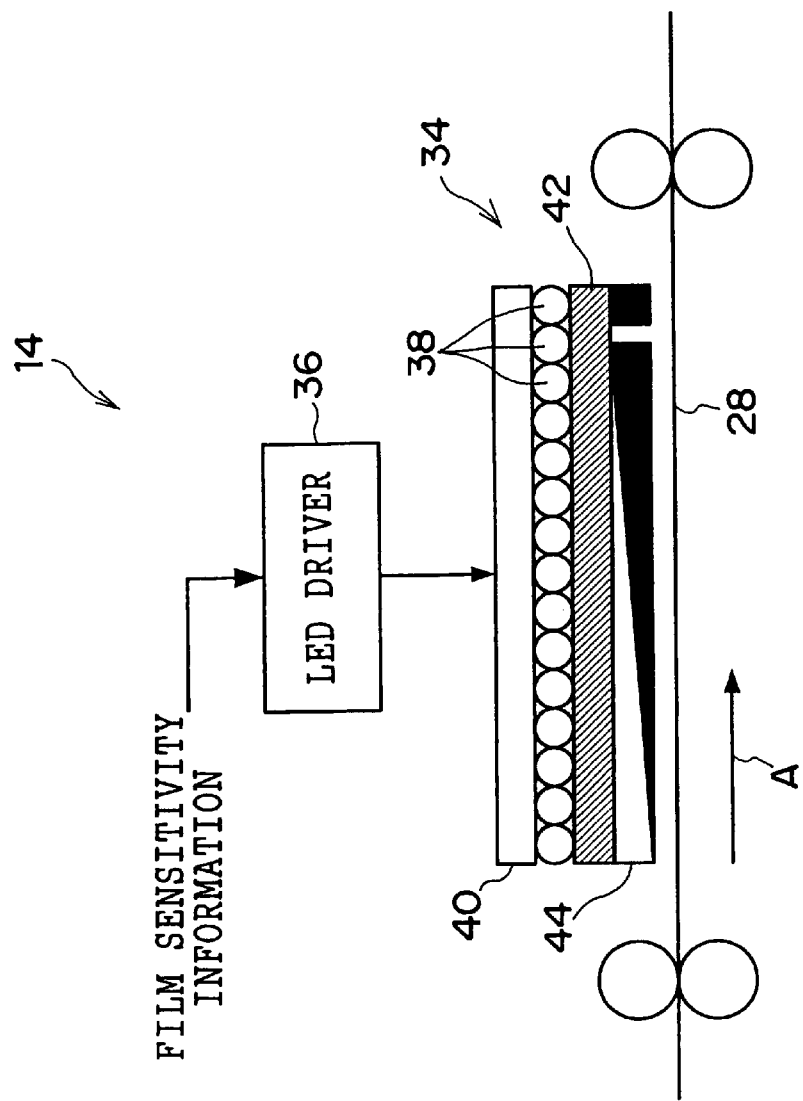
FIG. 4 is a schematic structural view of a reference exposure section.

As shown in FIG. 4, the reference exposure section 14 comprises an exposure section 34 and an LED driver 36. The exposure section 34 is provided with a diffusion plate 42 on the LED side of an LED substrate 40 with a plurality of LEDs 38 arranged, and a wedge 44 for producing a light intensity distribution along the film conveying direction on the light diffusion side of the diffusion plate 42.

Figure 5:
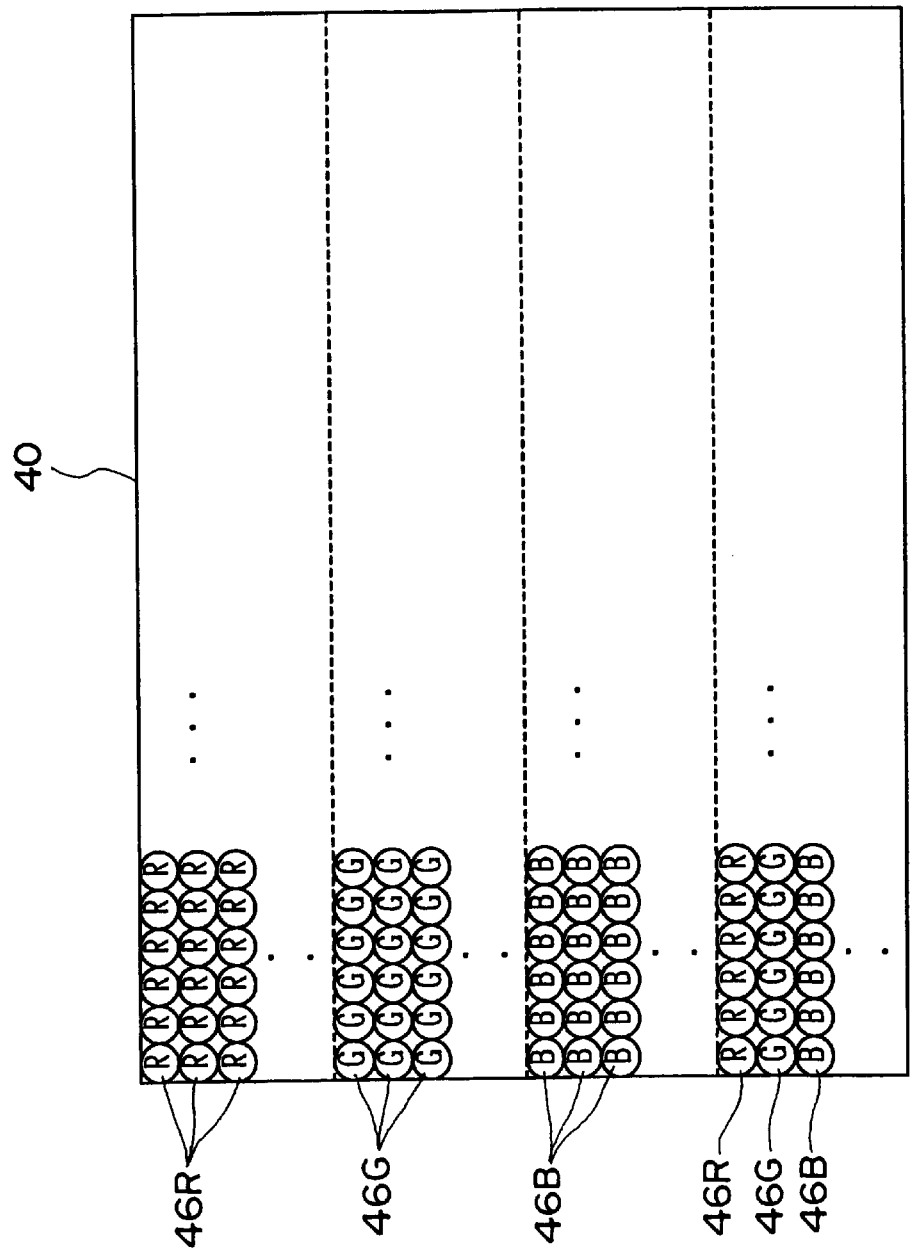
FIG. 5 is a plan view of an LED substrate.

As shown in FIG. 5, the LED substrate 40 is divided into four areas, with LEDs 46R for emitting red light (R light) arranged (R single color exposure portion) in the uppermost area in FIG. 5, LEDs 46G for emitting green light (G light) arranged (G single color exposure portion) in the second area from the top, LEDs 46B for emitting blue light (B light) arranged (B single color exposure portion) in the third area from the top, and LEDs 46R, LEDs 46G, and LEDs 46B arranged alternately in the lowermost area (gray exposure portion).

As to the R, G, B light amount balance in the gray exposure portion, it is preferable to determine the numbers of the LEDs 46R, the LEDs 46G, and the LEDs 46B so as to provide an approximately standard daylight color temperature such as D65.

The LED substrate 40 is connected with the LED driver 36. The LEDs 38 on the LED substrate 40 emit light uniformly according to a predetermined electric current supply from the LED driver 36. Moreover, the LED driver 36 can appropriately control the electric current to be supplied to each LED according to the type of the film by, for example, obtaining the film sensitivity information from the magnetic information reading section 12.

Light emitted from each LED is diffused by the diffusion plate 42 so as to be radiated to the photographic film 28 via the wedge. The wedge 44 is for changing the exposure amount to the photographic film 28. For example, as shown in FIG. 4, the exposure amount can be reduced continuously or stepwise from the upstream side to the downstream side in the conveying direction (arrow A direction) of the photographic film 28. The exposure amount can also be enlarged continuously or stepwise. Moreover, as shown by the line 48 of FIG. 6, the upstream side in the conveying direction of the photographic film 28 of the wedge 44 can be exposed linearly in the direction substantially orthogonal to the conveying direction. The exposure amount can also be changed by gradually reducing the electric current to be supplied to each LED along the film conveying direction without using the wedge 44.

Figure 6:
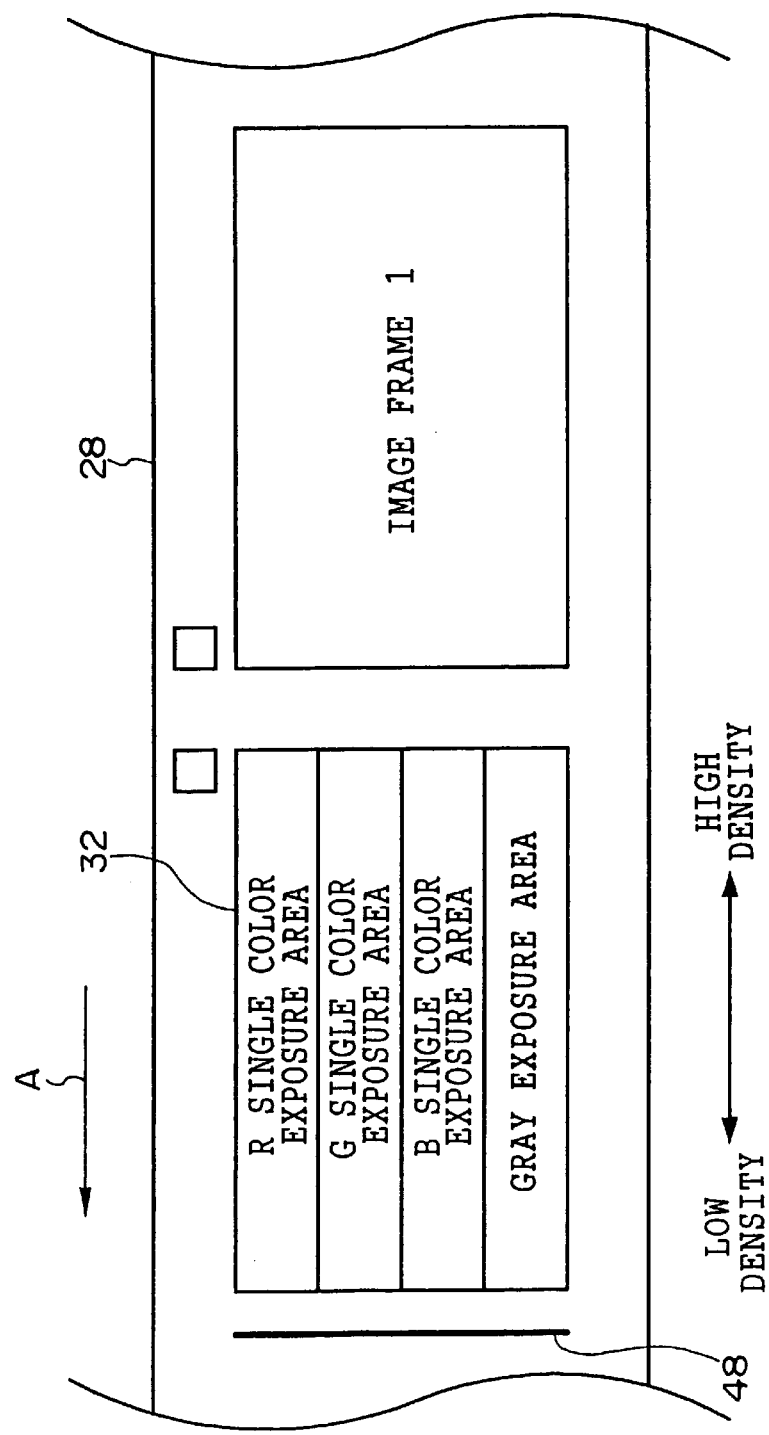
FIG. 6 is a diagram showing a reference exposure area of an APS film.

As shown in FIG. 6, the reference exposure area 32 of the photographic film 28 is subjected to reference exposure, by the reference exposure section 14, by R light, G light, B light, and light with R light, G light and B light mixed, that is, by gray light. Moreover, the photographic film 28 is exposed linearly in the direction substantially orthogonal to the conveying direction. By detecting the line 48 as the trigger line, it can be detected that the reference exposure area 32 has been subjected to reference exposure.

Figure 7:
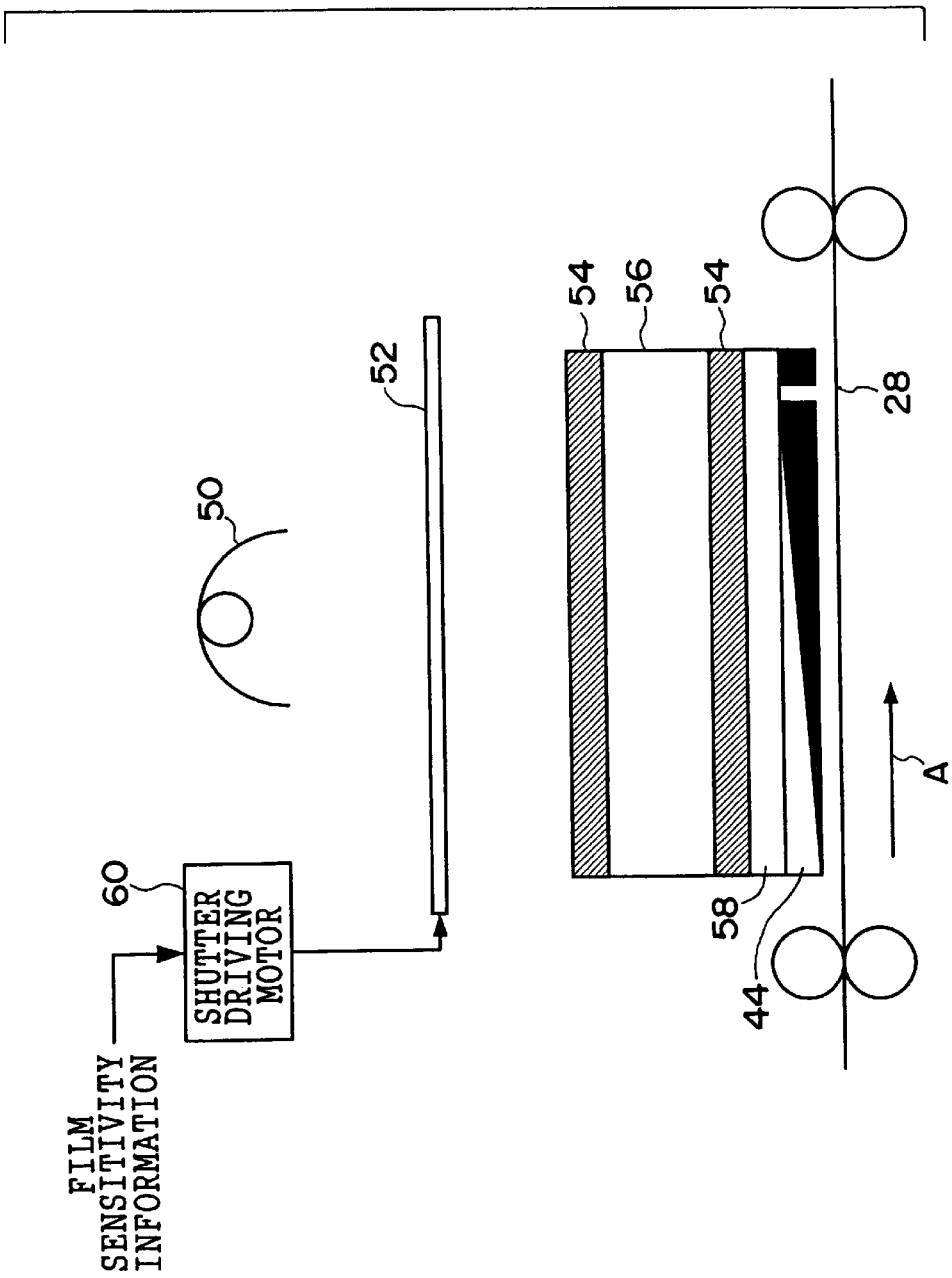
FIG. 7 is a schematic structural view of another embodiment of a reference exposure section.

As shown in FIG. 7, the reference exposure section 14 can comprise a light source such as a halogen lamp instead of the LEDs. The reference exposure section 14 shown in FIG. 7 comprises a halogen lamp 50, with a shutter 52 disposed on the light radiation side of the halogen lamp 50. At the light outputting side of the shutter 52 are disposed, in the following order, a diffusion box 56 with diffusion plates 54 mounted on the upper and lower sides, a color separation filter 58 for separating light into R light, G light, and B light, and the above-described wedge 44.

The color separation filter 58, which is formed by a filter for transmitting only R light from the incident light, a filter for transmitting only G light from the incident light, and a filter for transmitting only B light from the incident light, is provided at a position corresponding to the region at which the LEDs are disposed in FIG. 5. It is preferable to dispose a color temperature conversion filter at the region at which the LEDS 46R, 46G, 46B arranged alternately, so as to have an approximately standard daylight color temperature such as D65. Reference exposure similar to the case of FIG. 6 can thereby be carried out. Moreover, in order to reduce costs, correction can be executed based on the relationship between the halogen lamp color temperature and the D65 color temperature, without providing a filter.

Figure 8:
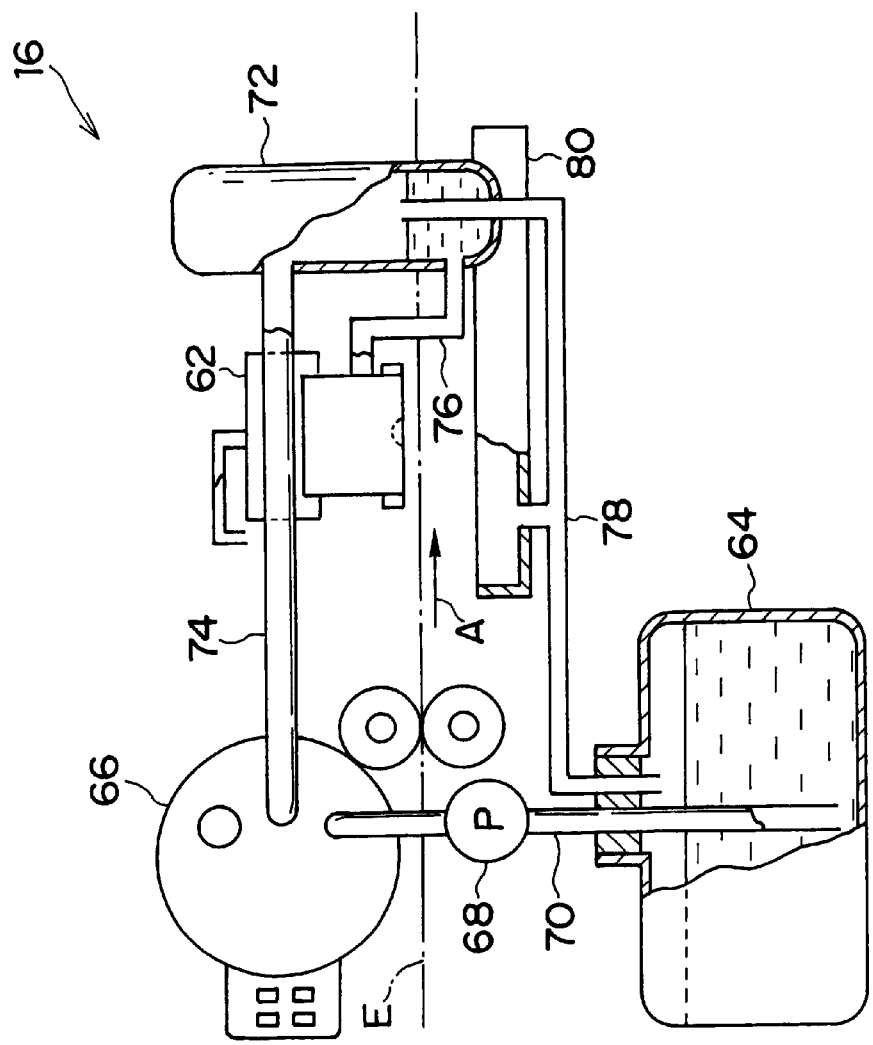
FIG. 8 is a schematic structural view of a black and white developing section.

Next, the black and white developing section 16 carries out black and white development by applying a developer for black and white development to the photographic film 28. As shown in FIG. 8, the black and white developing section 16 comprises an spray tank 62 for spraying the developer onto the photographic film 28.

A developer bottle 64 for storing the developer to be supplied to the spray tank 62 is provided below the spray tank 62, and a filter 66 for filtering the developer is provided above the developer bottle 64. Furthermore, a liquid feeding pipe 70 provided with a pump 68 therealong connects the developer bottle 64 and the filter 66.

Moreover, a sub tank 72 for storing a developer fed from the developer bottle 64 is provided adjacent to the spray tank 62, with a liquid feeding pipe 74 extending from the filter 66 to the sub tank 72.

Therefore, when the pump 68 is driven, the developer is fed from the developer bottle 64 to the filter 66 side, and the developer which has passed through the filter 66 and has been filtered is fed to the sub tank 72 so that the developer is stored temporarily in the sub tank 72.

Moreover, a liquid feeding pipe 76 linking the sub tank 72 and the spray tank 62 is disposed therebetween so that the developer fed from the developer bottle 64 by the pump 68 via the filter 66, the sub tank 72, the liquid feeding pipe 76, or the like, is filled into the spray tank 62.

A tray 80 connected with the developer bottle 64 by a circulating pipe 78 is provided below the spray tank 62 such that the developer overflowing from the spray tank 62 is collected by the tray 80 and returned to the developer bottle 64 via the circulating pipe 78. Moreover, the circulating pipe 78 is connected with the sub tank 72 in a state in which the circulating pipe 78 projects into the sub tank 72, such that the developer stored in the sub tank 72, in excess of the amount required can be returned to the developer bottle 64.

Figure 10:
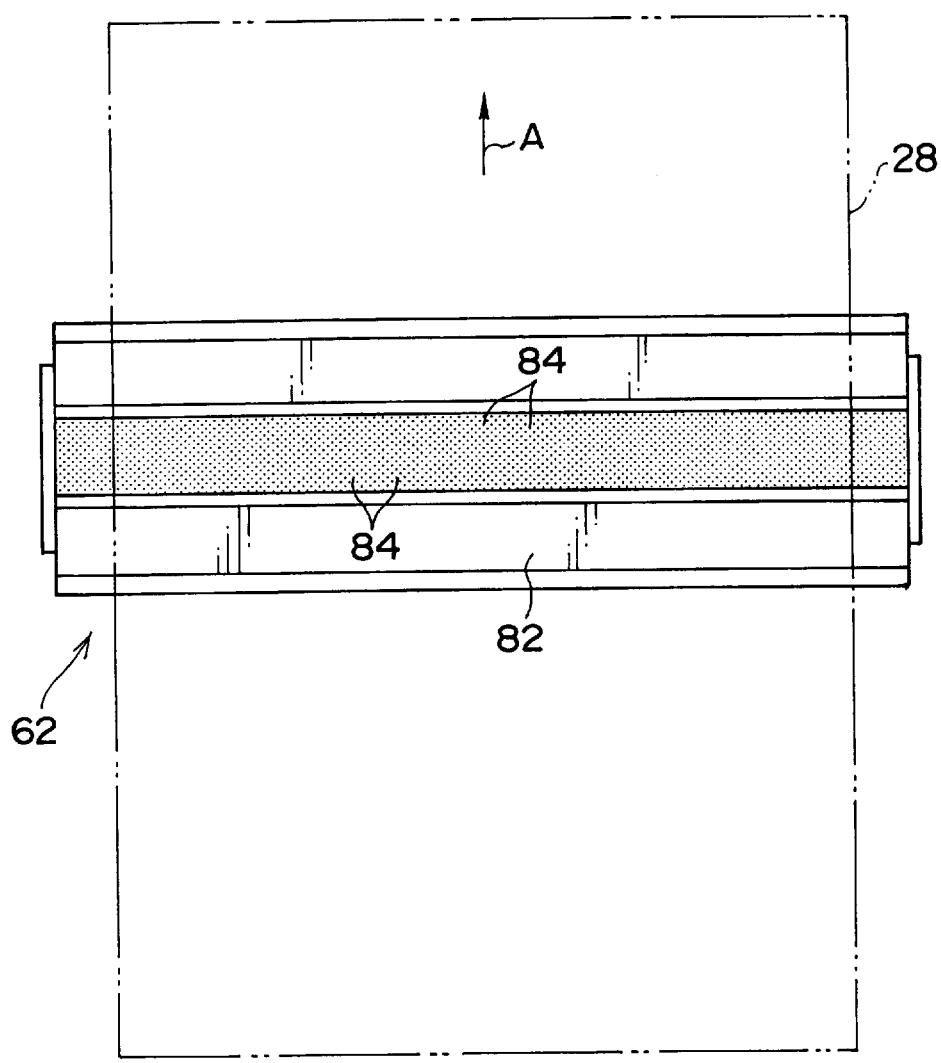
FIG. 10 is a bottom view of the spray tank.

Furthermore, as shown in FIGS. 9 and 10, a nozzle plate 82 formed by bending an elastically deformable rectangular thin plate is provided at a portion which is a portion of the wall surface of the spray tank 62 and which faces the conveyance path E of the photographic film 28.

A plurality of nozzle holes 84 (for example, of a diameter of several tens of $\mu$m) are formed in the nozzle plate 82 over the entirety thereof in the transverse direction of the photographic film 28 at constant intervals along a direction intersecting the conveying direction A of the photographic film 28, which is the longitudinal direction of the nozzle plate 82, so as to provide a nozzle rows extending linearly. Furthermore, the plurality of nozzle rows are provided in staggered fashion on the nozzle plate 82.

That is, the plurality of the nozzle rows comprising a plurality of the nozzle holes 84 disposed linearly are provided so as to extend in the longitudinal direction of the spray tank 62 such that the developer stored in the spray tank 62 can be ejected toward the photographic film 28 from each nozzle hole 84 forming the nozzle rows.

Due to the spray of the developer from the spray tank 62, the photographic film 28 conveyed at a substantially constant speed is subjected to black and white development.

The buffer section 18 is for absorbing the speed difference between the conveyance speed of the photographic film 28 which is a substantially constant speed in the black and white developing section 16, and the conveyance speed of the photographic film 28 by to a film carrier 86 described later. If the conveyance speed in the black and white developing section 16 and the conveyance speed by the film carrier 86 are same, the buffer section can be eliminated.

The film scanner 12 is for reading out the image recorded on the photographic film 28 which has been subjected to developing processing by the black and white developing section 16, and outputting the image data obtained by the reading. As shown in FIGS. 1 and 11, the film scanner 12 includes the film carrier 86.

Figure 12A:
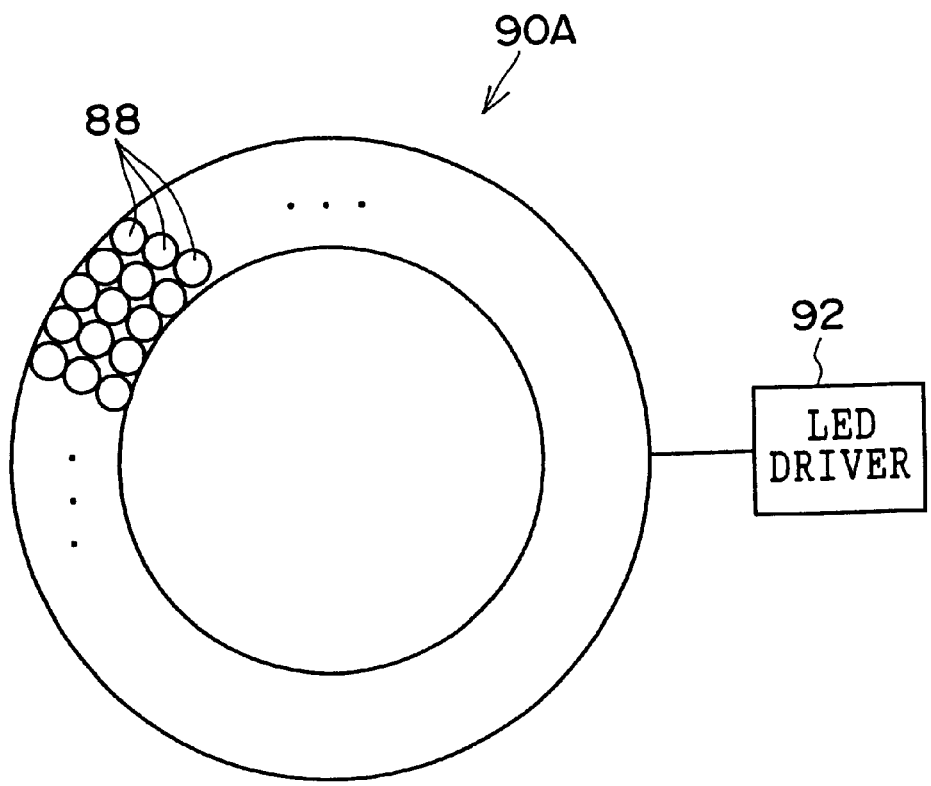
FIG. 12A is a bottom view of an illumination unit.
Figure 12B:
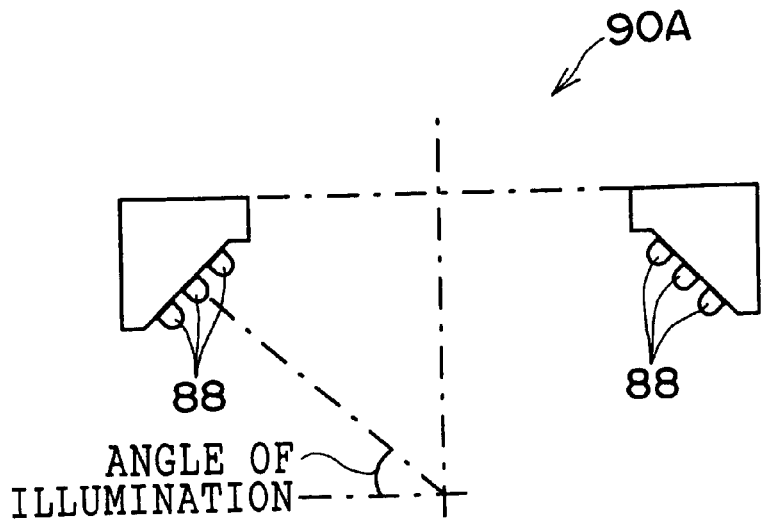
FIG. 12B is a side view of the illumination unit.

As shown in FIG. 12, a LEDs 88 are provided in a ring-like shape above the film carrier 86, and an illumination unit 90A for irradiating light to the photographic film 28 is provided above the film carrier 86. Light emitted from the illumination unit 90A is light (IR light) of an infrared area wavelength (about a 950 nm central wavelength) as shown in FIG. 13. The illumination unit 90A is driven by an LED driver 92.

Figure 15:
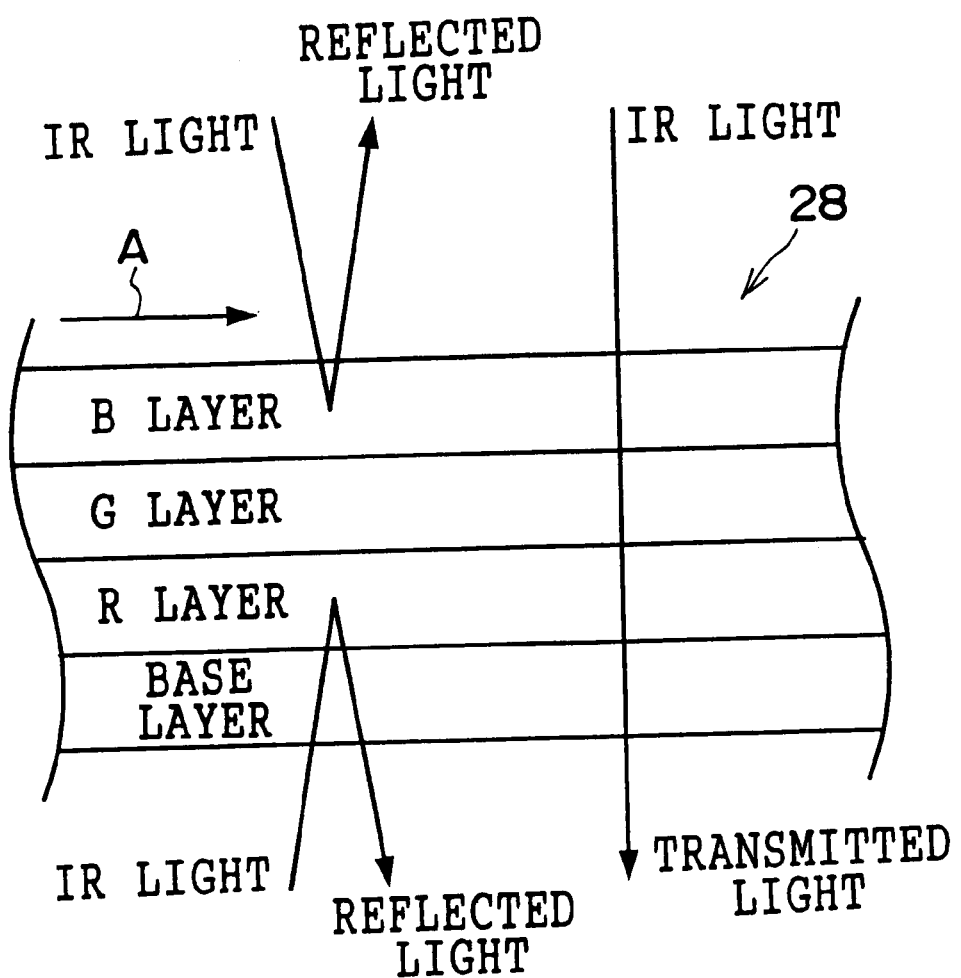
FIG. 15 is a diagram for explaining image reading using IR light.
Figure 18:
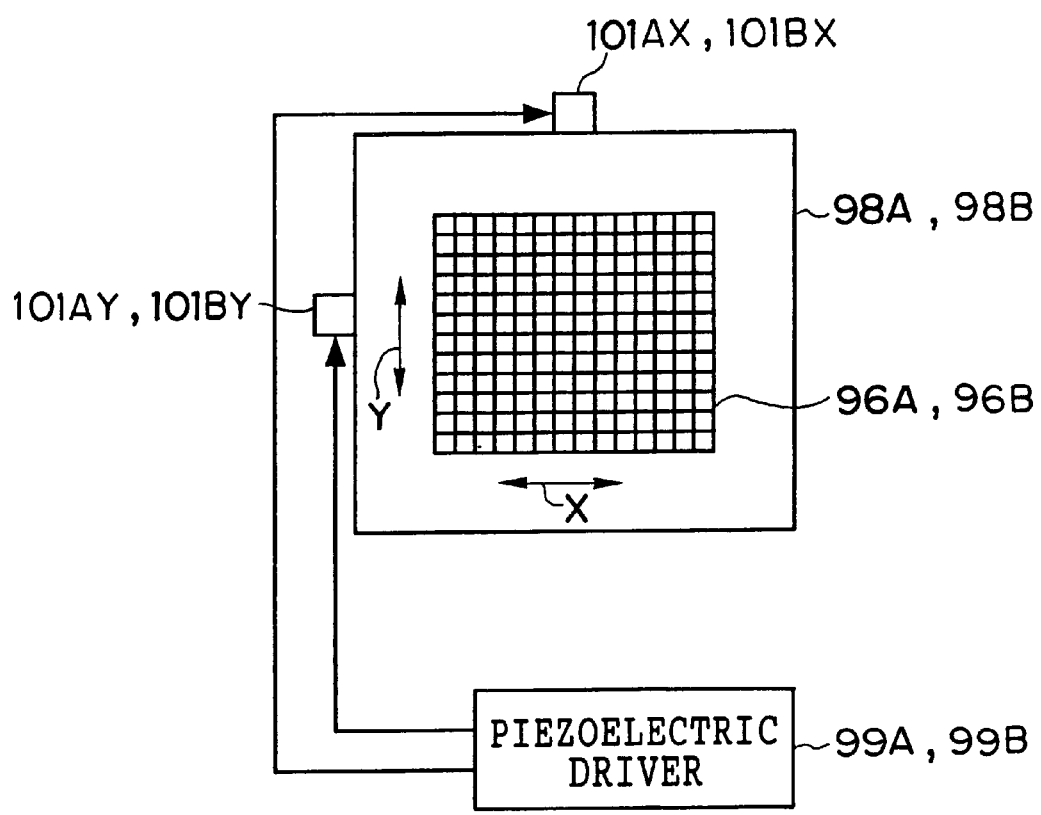
FIG. 18 is a schematic structural view of a pixel displacement unit.

As shown in FIGS. 11 and 15, an image forming lens 94A for focusing light reflected by the B layer of the photographic film 28, and an area CCD 96A for detecting the light reflected by the B layer of the photographic film 28 are disposed in that order above the illumination unit 90A along the optical axis L. As shown in FIGS. 18 and 24A, the area CCD 96A is a monochrome CCD with a large number of CCD cells (photoelectric conversion cells) 180 which serve as photoelectric conversion elements and which have a sensitivity in the infrared area and which are arranged like a matrix, such that the light receiving surfaces thereof substantially coincide with the focal point of the image forming lens 94A. The CCD cells are formed by, for example, photodiodes. Moreover, as shown in FIG. 18, the area CCD 96A is provided on a pixel displacement unit 98A serving as the moving means. The area CCD 96A forms the reading sensor of the present invention.

As shown in FIG. 18, the pixel displacement unit 98A is connected with piezoelectric elements 101AX, 101AY to be driven by a piezoelectric driver 99A. By vibrating the piezoelectric elements 101AX, 101AY each in the X direction and the Y direction in FIG. 18 by the piezoelectric driver 99A, the pixel displacement unit 98A, that is, the area CCD 96A can be displaced in the X direction and the Y direction.

Accordingly, in a case in which the resolution of the area CCD 96A is, for example, 1.5 million pixels, as shown in FIG. 20C, by reading out an image with the area CCD 96A moved in the X1 direction, the Y1 direction, the X2 direction, and the Y2 direction successively by ½ of a pixel, the image can be read out at a resolution of four times, that is, by 6 million pixels.

Moreover, a black shutter 100A is provided between the area CCD 96A and the image forming lens 94A.

The area CCD 96A is connected with a scanner control part 104 via a CCD driver 102A. The scanner control part 104 comprises a CPU, a ROM (for example, a ROM whose stored contents are rewritable), a RAM and an input/output port, with these components connected with each other via a busses, or the like. The scanner control section 104 controls the operation of each part of the film scanner 20. Moreover, the CCD driver 102A generates a drive signal for driving the area CCD 96A for controlling the driving of the area CCD 96A.

An illumination unit 90B, an image forming lens 94A, an area CCD 96B provided on a pixel displacement unit 98B, and a CCD driver 102 are provided in that order below the film carrier 86. These components have the same configuration as the above-mentioned illumination unit 90A, image forming lens 94A, area CCD 96A, and CCD driver 102A, respectively. However, the area CCD 96B detects the reflected light reflected by the R layer of the photographic film 28 among the IR light irradiated to the photographic film 28 by the illumination unit 90B as shown in FIG. 15, and the transmitted light transmitted through the photographic film 28 among the light irradiated to the photographic film 28 by the illumination unit 90A. The area CCD 96B corresponds to the reading sensor of the present invention.

Figure 14A:
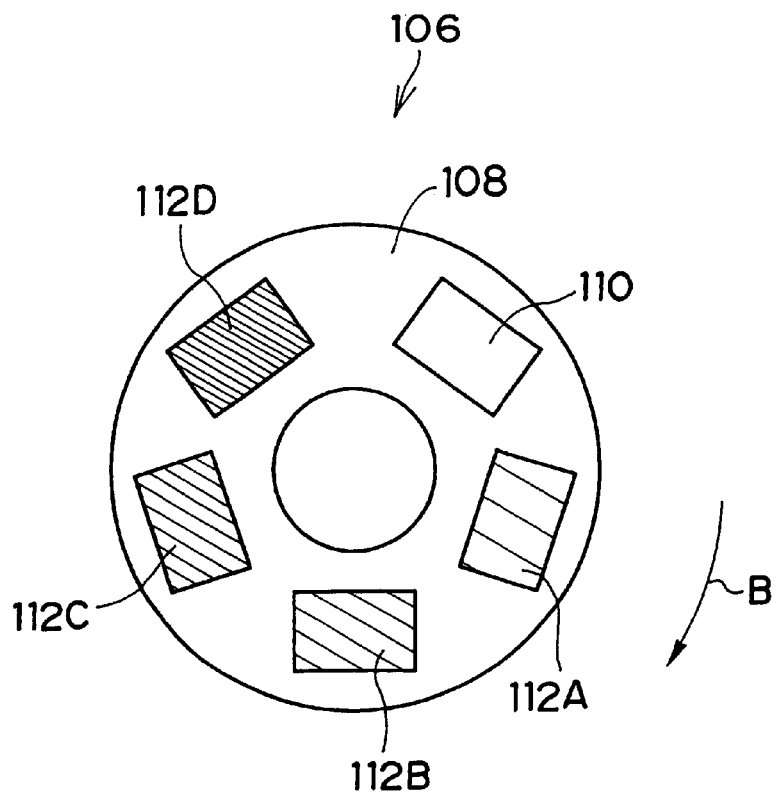
FIG. 14A is a plan view of an ND filter for brightness correction.

Moreover, an ND filter 106 for brightness correction is provided between the illumination unit 90B and the film carrier 86. As shown in FIG. 14A, the ND filter 106 for brightness correction comprises filters 112A to 112D having transmittances different from each other fitted in a plurality of (in the present embodiment, five) opening portions (except an opening portion 110) provided in a turret 108 rotatable in the arrow B direction.

The film carrier 86 conveys the photographic film 28 so as to position the image surface center of the image recorded on the photographic film 28 at a position coinciding with the optical axis L (reading position).

Figure 16:
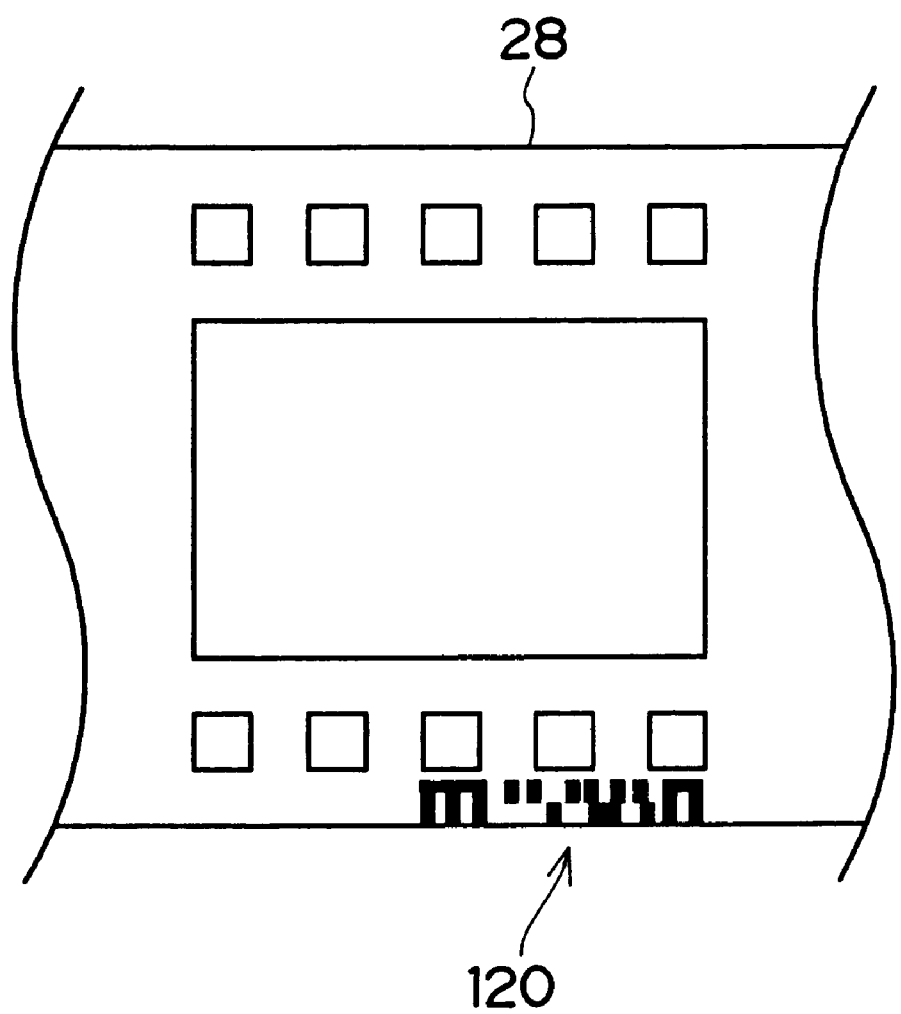
FIG. 16 is a diagram showing a DX code.

Moreover, the film carrier 86 comprises a DX code reading sensor 114, a frame detecting sensor 116, and reflection plates 118A, 118B for brightness correction. The DX code reading sensor 114 reads out a DX code 120 optically recorded on the 135 size photographic film 28 as shown in FIG. 16. The frame detecting sensor 116 detects the image frame position of the photographic film 28. Accordingly, the image surface center of the image can be positioned at a position coinciding with the optical axis L.

Figure 14B:
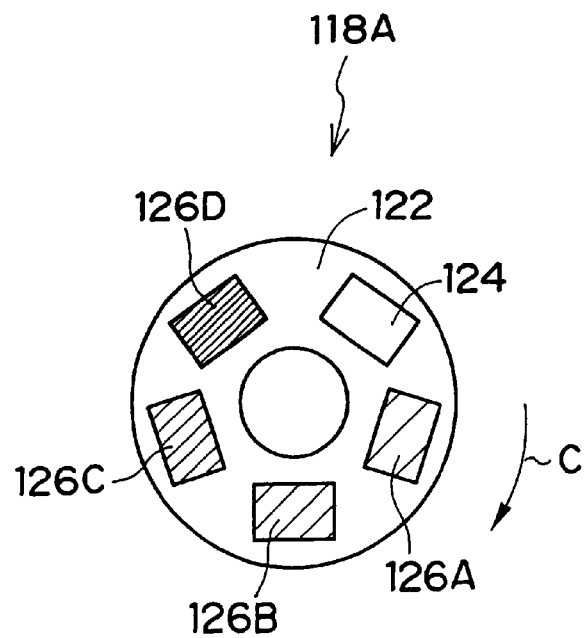
FIG. 14B is a plan view of a reflection plate for brightness correction.

As shown in FIG. 14B, the reflection plates 118A, 118B for brightness correction, which are disposed at positions facing the photographic film 28, comprise reflection plates 126A to 126D having reflectances different from each other and fitted in a plurality of (in this embodiment, five) opening portions (except an opening portion 124) provided on a turret 122 rotatable in the arrow C direction.

The photographic film 28 is conveyed by the film carrier 86 so as to be positioned with the image surface center of the image recorded on the photographic film 28 disposed at a position coinciding with the optical axis L (reading position). Moreover, the scanner control section 104 rotates the turret 122, 108 such that the opening portion 124 of the reflection plates 118A, 118B for the brightness correction and the opening portion 110 of the ND filter 106 for the brightness correction are provided on the optical axis L with the image positioned at the reading position. The scanner control section 104 also sets the charge accumulating times t1, t2 of the area CCDs 96A, 96B corresponding to predetermined reading conditions each in the CCD drivers 102A, 102B.

Figure 17:
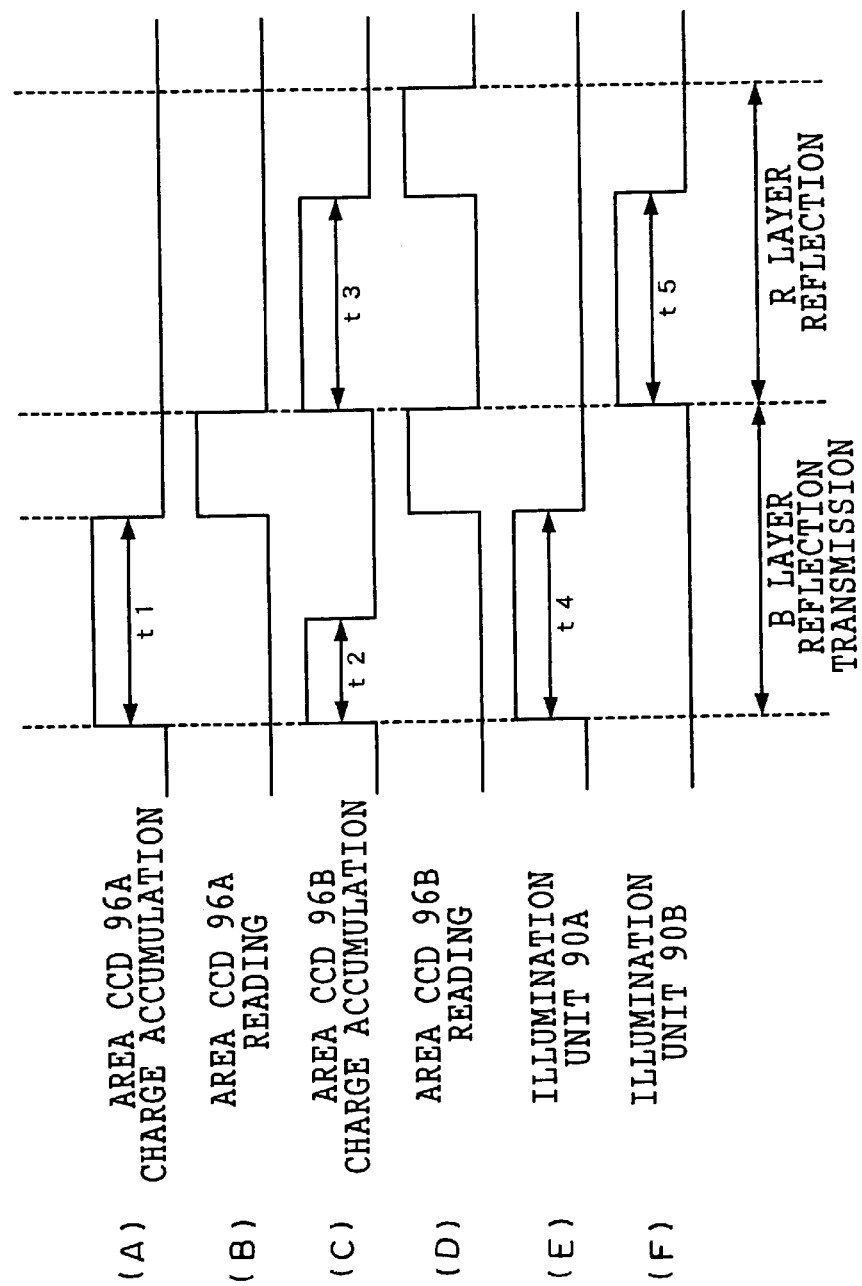
FIG. 17 is a timing chart showing the image reading timing according to the first embodiment of the present invention.

Accordingly, as shown in FIG. 17E, when the illumination unit 90A is lit by the scanner control portion 104, the IR light is irradiated to the B layer side of the photographic film 28 so that the light reflected by the B layer of the photographic film 28 is detected by the area CCD 96A as shown in FIG. 17A (more specifically, the photoelectrically converted charge is accumulated), and a signal representing the reflected light amount is outputted from the area CCD 96A as shown in FIG. 17B.

Furthermore, light (more specifically, converted photoelectrically) transmitted through the photographic film 28 at the same time is detected by the area CCD 96B as shown in FIG. 17C, and is outputted from the area CCD 96B as a signal representing the transmitted light amount as shown in FIG. 17D.

When the detection of the transmitted light and the light reflected by the R layer is finished, as shown in FIG. 17F, the illumination unit 90B is lit by the scanner control section 104 as shown in FIG. 17F, the IR light is irradiated to the base layer side of the photographic film 28, and the light reflected (more specifically, converted photoelectrically) by the R layer of the photographic film 28 is detected by the area CCD 96B as shown in FIG. 17C and is outputted from the area CCD 96B as a signal representing the reflected light amount as shown in FIG. 17D.

The light amounts of the lights irradiated by the illumination units 90A, 90B, the lighting times t4, t5, and the charge accumulating times t1, t2, t3 by the area CCDs 96A, 96B are set optimally according to set up calculation by the control section 140 described later, and in accordance with the type of the film, or the like.

The reflection light amount by the B layer is changed depending on the developed silver amount contained in the B layer (blue-light-photosensitive layer), that is, the silver image amount in the B layer. Therefore, the photoelectric conversion of the light reflected by the B layer corresponds to the operation of reading the image information of a yellow dye image obtained in the case of color development instead of black and white development. Similarly, the photoelectric conversion of the light beam reflected by the R layer (red-light-photosensitive layer) corresponds to the operation of reading the image information of a cyan dye image obtained in the case of color development. Moreover, the photoelectric conversion of the transmitted light beam corresponds to the operation of reading an image which is obtained in the case of color development and in which are mixed the yellow dye image, the magenta dye image in the green-light-photosensitive layer, and the cyan dye image.

Signals outputted from the area CCDs 96A, 96B are amplified by amplifier circuits 128A, 128B, and are converted to digital data representing the reflection light amount by A/D converters 130A, 130B, and are inputted to correlation double sampling circuits (CDS) 132A, 132B. The CDSs 132A, 132B sample field-through data representing the level of a field-through signal and pixel data representing the level of a signal for each pixel. The CDSs 132A, 132B subtract the field-through data from the pixel data for each pixel, and output the calculation results (data accurately corresponding to the accumulated charge amount in each CCD cell) to the image processing apparatus 22 as image data successively.

The image data outputted from the CDSs 132A, 132B are each inputted to brightness and darkness correction sections 134A, 134B. Brightness and darkness correction is carried out in the brightness and darkness correction sections 134A, 134B according to present darkness correction data and brightness correction data.

The brightness and darkness correction section 134A stores, as darkness correction data for each cell in an unillustrated memory, data which has been inputted to the brightness and darkness correction section in a state in which the light incident side of the area CCD 96A is shut-off from light by the black shutter 100A (see FIG. 11) (i.e., data expressing the dark output level of each cell of the area CCD 96A). The brightness and darkness correction section 134A carries out darkness correction by subtracting the dark output levels of the cells corresponding to the respective pixels form the inputted image data. The darkness correction data are set, for example, at the time of inspection when the apparatus is initially used, or each time a predetermined amount of time passes, or each time scanning is carried out. However, it is preferable that the darkness correction data are set at a frequency which enables corrections for fluctuations in the dark output level. The darkness correction by the brightness and darkness correction section 134B can be executed in the same manner as mentioned above.

Moreover, in the case of carrying out brightness correction by the brightness and darkness correction section 134A on image data of an image recorded on the photographic film 28 subjected to ordinary color development, first, the reflected light is read by the area CCD 96A using a material with a high reflectance, such as a white plate. Based on the inputted data (the density irregularity of each pixel represented by the data is derived from the photoelectric conversion characteristics irregularity of each cell), the gain is determined for each cell and is stored in a memory (not shown) as the brightness correction data. Then, the inputted image data of the frame image which is the object of reading are corrected for each pixel according to the gain determined for each cell. The brightness correction by the brightness and darkness correction section 134B can be executed in the same manner as mentioned above. Furthermore, in the case of the brightness correction by reading out transmitted light from the illumination unit 90A, the brightness correction is executed in a state in which the light from the illumination unit 90A is directly received by the cells.

However, in the case of carrying out brightness correction on image data of an image recorded on the photographic film 28 subjected to black and white development, if the brightness correction is carried out by using a white plate or being directly received by the cells, an image density obtained by the corrected image data is too bright as compared with the image density recorded in the photographic film 28, and thus the brightness correction cannot be executed appropriately. Therefore, it is preferable to carry out brightness correction with the density of an unexposed portion of the photographic film 28 used as the reference density for the brightness correction, and with a reflection plate having a reflection density or a filter having a transmission density close thereto disposed on the optical axis L. Accordingly, the brightness correction of the photographic film 28 for which black and white development has been carried out, can be executed appropriately. The reference density for the brightness correction is selected by a set up calculation by the control section 140 described later.

Moreover, the brightness correction can be carried out with an unexposed portion of the photographic film 28 positioned on the optical axis. Accordingly, the ND filter 106 for brightness correction and the reflection plates 118A, 118B for brightness correction can be eliminated, and thus costs can be reduced. In this case, in reading the unexposed portion, the charge accumulating time and the light amount are set so as to be close to the saturated point (the brightest point in a state capable of having linearity) of the area CCDs 96A, 96B. The average value of a plurality of reading operations of the unexposed portion in this state is stored in a memory (not shown) as the brightness correction data.

In the case of reading with a high S/N, it is possible to carry out a pre-scan for each frame and set the charge accumulating time and the light amount using the brightest point of the frame. It is also possible to set the charge accumulating time and the light amount based on the reading data of the unexposed portion and re-scan in an even brighter condition (with a longer accumulating time or an increased light amount) in the case the film is judged to be an overexposed negative film by the first scan.

The image data which has been subjected to brightness and darkness correction processing by the brightness and darkness correction sections 134A, 134B are outputted to the image processing apparatus 22.

As shown in FIG. 1, the image processing apparatus comprises a frame memory 136, an image processing section 138, and the control section 140. The frame memory has a capacity capable of storing the image data of the frame image of each frame so that the image data inputted from the film scanner 20 are stored in the frame memory 136. The image data inputted in the frame memory 136 are subjected to image processing by the image processing section 138.

The image processing section 138 carries out various types of image processes according to the processing conditions determined for each image by and transmitted from the control section 140.

The control section 140 comprises a CPU 142, a ROM 144 (for example, a ROM whose stored contents are rewritable), a RAM 146, an input/output port (I/O) 148, a hard disc 150, a keyboard 152, a mouse 154, and a monitor 156, with these components connected with each other via busses. The CPU 142 of the control section 140 calculates parameters of the various types of image processings executed in the image processing section 138 (set up calculation) based on the read data of the reference exposure section inputted from the frame memory 136, and outputs the same to the image processing section 138. The calculation is carried out as follows.

For example, from the read data of the reflected light in the R single color exposure area in the reference exposure area 32 and the read data of the transmitted light in the R single color exposure area, a conversion characteristic f1 for converting from the R reflection density to the R transmission density is determined. Since each exposure area has the exposure amount gradually reduced from the conveying direction upstream side of the photographic film 28 as mentioned above, the data of each exposure area from the high density to the low density can be obtained. Therefore, for the conversion characteristic f1, by calculating the value obtained by subtracting the reflected light read data from the transmitted light read data, the conversion curve for converting from the R reflection density to the R transmission density can be obtained. Here, given that the reflection density of R is DHR and the transmission density of R is DTR, DTR=f1 (DHR).

Similarly, the CPU 142 determines a conversion characteristic f2 for converting from the B reflection density to the B transmission density from the read data of the reflected light in the B single color exposure area in the reference exposure area 32, and the read data of the transmitted light in the B single color exposure area. Here, given that the reflection density of B is DHB and the transmission density of B is DTB, DTB=f2 (DHB)

Figure 19:
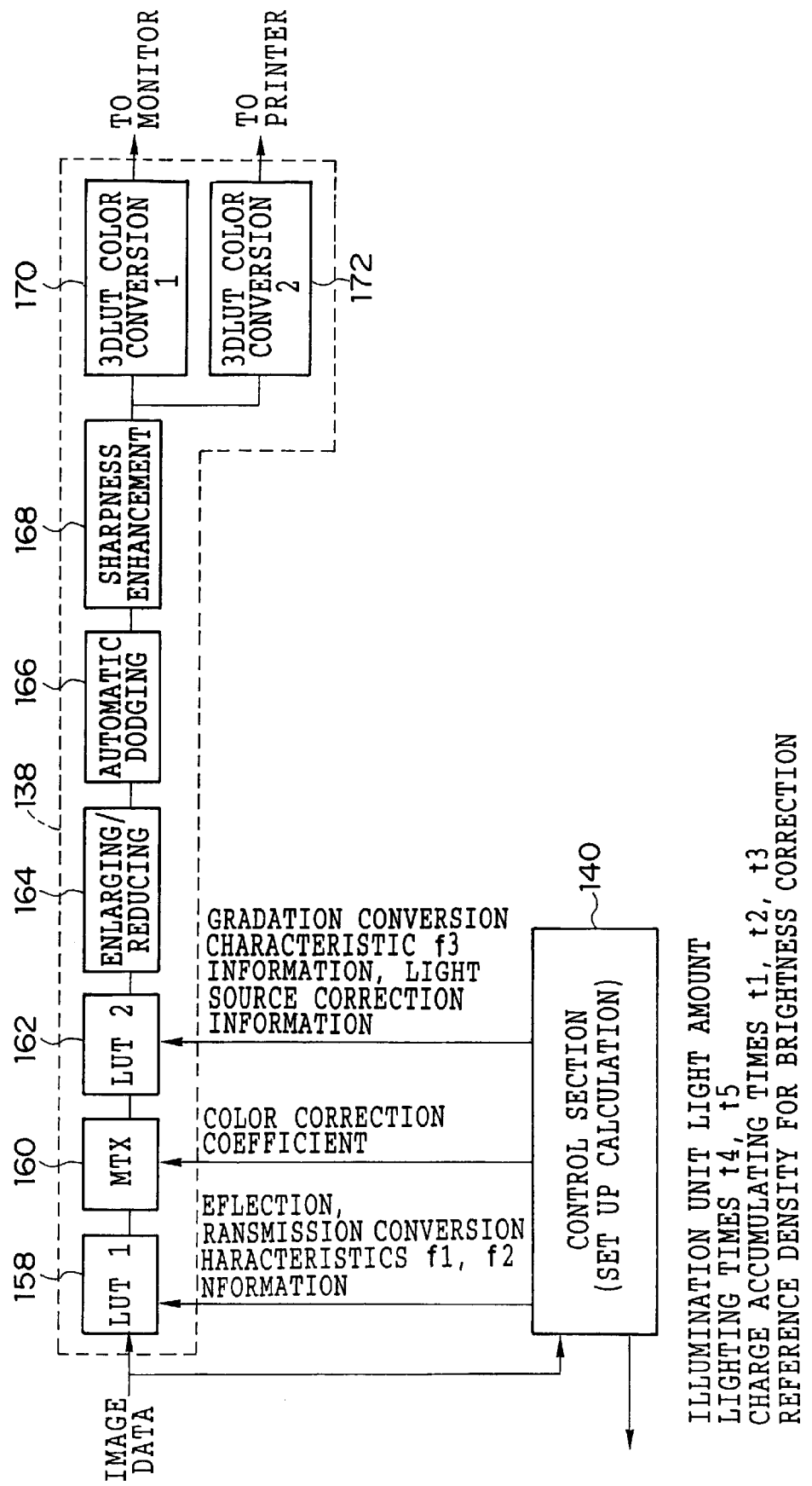
FIG. 19 is a schematic structural view of an image processing section according to the first embodiment of the present invention.

As shown in FIG. 19, the control section 140 outputs the data of the calculated conversion characteristics f1, f2 to the LUT (look up table) 158 of the image processing section 138. In the LUT 158, the inputted read data of the R image and the B image are subjected to log conversion so as to be the reflection density data, and the converted reflection density data are converted to the transmission density data by the conversion characteristics f1, f2. The operation of converting to the transmission density after finding the conversion characteristics is carried out because light passes through a layer twice in the intermediate density range so that the reflection density becomes about double as much as the transmission density, and thus the reflection density and the transmission density are in a non-linear relationship in a high density range such as density saturation, such that appropriate correction of the gray balance or the like is not possible in the case in which reflection reading and transmission reading are both executed.

In contrast, since the G layer transmission reading data DTG are included in the transmission density data of the total of the R, G, B layers, given that the transmission reading data of the total of the R, G, B layers is DTRGB, DTG=DTRGB−DTR−DTB. This calculation is carried out a MTX (matrix) circuit 160.

Assuming that there is no color mixing, the values of the R layer reflection density read out from the base layer side in the G single color exposure area, and the B layer reflection density read out from the emulsion side become zero. This is because the R layer and the B layer are considered to not reflect at all since the developed silver does not exist in the R layer and the B layer in the G single color exposure area. However, since color mixing is generated in the reflection read data of the R layer and the B layer due to the influence by the lower layer (in the case of the present embodiment, the G layer), unclear color reproduction is carried out as it is. Similarly, assuming that there is no color mixing, the values of the B layer reflection density and the G layer transmission density in the R single color exposure area, and the R layer and G layer reflection densities in the B single color exposure area become zero. However, color mixing occurs in actuality due to the influence by another layer as mentioned above.

By determining the transmission density of each layer in each single color exposure area, the influence of the color mixing is eliminated as explained below. First, the color mixing coefficient aij representing the degree of the color mixing of the j color in the i color is calculated. Here, i, j=1, 2, 3, wherein 1 denotes R, 2 denotes G, and 3 denotes B, respectively.

Given that the transmission density data of R, G, B in a case in which there is no color mixing are R, G, B, the transmission density data R', G', B' of R, G, B in a case in which there is color mixing can be represented by the following formulas.

$$R' = \phantom{a21\cdot}R + a12\cdot G + a13\cdot B \qquad (1)$$
$$G' = a21\cdot R + \phantom{a12\cdot}G + a23\cdot B$$
$$B' = a31\cdot R + a32\cdot G + \phantom{a13\cdot}B$$

$$\begin{pmatrix} R' \\ G' \\ B' \end{pmatrix} = \begin{pmatrix} 1 & a12 & a13 \\ a21 & 1 & a23 \\ a31 & a32 & 1 \end{pmatrix} \begin{pmatrix} R \\ G \\ B \end{pmatrix} \qquad (2)$$

Here, the color mixing coefficients a12, a32 can be determined from the transmission density DTR of the R layer in the G single color exposure area and the transmission density DTB of the B layer. Similarly, the color mixing coefficients a13, a23 can be determined from the transmission density DTR of the R layer in the B single color exposure area and the transmission density DTG of the G layer. Furthermore, the color mixing coefficients a21, a31 can be determined from the transmission density DTB of the B layer in the R single color exposure area and the transmission density DTG of the G layer.

The CPU 142 calculates the inverse matrix of the formula (2) comprising the above-mentioned color mixing coefficients so as to determine a color correction coefficient, and outputs the same to the MTX circuit 160. It is also possible to determine the color correction coefficients by preliminarily exposing an optional color chart and optimizing the read data thereof and a color reproduction target value by the least squares method or the like without carrying out the R, G, B single color exposure. Moreover, although the color correction is executed above by a 3×3 matrix, it is also possible to carry out color correction more accurately by a 3×10 matrix.

The MTX circuit 160 calculates the data each for R, G, B in which there is no color mixing by using the correction coefficients, and outputs the same to a LUT 162. The LUT 162 carries out gray balance correction and contrast correction. The CPU 142 determines the parameters for carrying out the gray balance correction and the contrast correction.

That is, a conversion characteristic f3 is determined from the gray exposure area reading data of the reference exposure area 32 and a predetermined target gray density. However, in usual photography, a light source of various color temperatures is used, and the gray balance cannot be corrected sufficiently from the gray exposure area reading data of the reference exposure area 32. Therefore, the light source correction coefficient of the photographing light source is estimated for each frame and is outputted to the LUT 162. That is, the LUT 162 carries out the gray balance correction with the conversion characteristic f3 as the reference for the gradation conversion characteristics, and also carries out gradation balance correction by correction with the light source correction coefficient. Moreover, because the contrast of black and white development differs from the contrast of the reference color development, the contrast correction is executed.

The image data applied for which gray balance correction and contrast correction have been carried out are enlarged or reduced by a predetermined ratio by an enlarging/reducing section 164, are subjected to a dodging process by an automatic dodging section 166, and are subjected to sharpness enhancement processing by a sharpness enhancement section 168.

The image data which have been subjected to image processing in this way are converted to image data to be displayed on the monitor 154 by a 3D (three-dimensional) LUT color conversion section 170, as well as are converted to image data to be printed on a printing paper in the printer section 24 by a 3D LUT conversion section 172.

The printer section 24 comprises, for example, an image memory, R, G, B laser light sources, a laser driver for controlling the operation of the laser light sources, or the like (all not shown). The recording image data inputted from the image processing apparatus 22 are read out after being stored temporarily in the image memory, and are used for the modulation of the R, G, B laser light outputted from the laser light sources. The laser light outputted from the laser light sources scan the printing paper via a polygon mirror and an fθ lens so that an image is exposed and recorded on the printing paper. The printing paper with the image exposed and recorded thereon is fed to the processor section 26 so as to be subjected to color developing, bleaching fixing, washing with water, and drying processes. Accordingly, the image exposed and recorded on the printing paper is made visible.

Next, the operation of the present embodiment will be explained with an example of a case of processing an APS film.

First, prior to the processing the photographic film 28, the above-described brightness and darkness correction is executed and the brightness correction data and the darkness correction data are set in a memory (not shown) in the brightness and darkness correction sections 134A, 134B.

When the photographed photographic film (APS film) 28 is conveyed in the arrow A direction in FIG. 1, the magnetic information recorded in the magnetic layer 30, that is, the information concerning the type of the film, such as the film sensitivity, is read out in the magnetic information reading section 12.

Next, the reference exposure area 32 of the photographic film 28 provided at the leading end side of the photographic film 28 as the unexposed area is subjected to reference exposure from the low density range to the high density range for the R, G, B, and gray colors as shown in FIG. 6.

The photographic film 28, on which reference exposure has been carried out by the reference exposure section 14, is subjected to black and white development by the black and white developing section 16. Accordingly, the silver halide exposed by the photography in each of the R, G, and B layers in the photographic film 28 is developed so as to form a silver image of each color.

The photographic film 28 which has been subjected to black and white development is conveyed to the film scanner 20 via the buffer section 18. When the reference exposure area 32 is detected by the frame detecting sensor 116, the center part of the reference exposure area 32 is positioned so as to be on the optical axis L.

The turrets 108, 122 are rotated by the scanner control section 104 so as to have the opening portion 110 of the ND filter 106 for brightness correction and the opening portion 124 of the reflecting plates 118A, 118B for brightness correction positioned on the optical axis L.

Next, the scanner control section 104 sets the charge accumulating times t1, t2, t3 for the CCD drivers 102A, 102B, and lights the illumination units 90A, 90B for the lighting times t4, t5 so as to irradiate the IR light onto the photographic film 28. Accordingly, the reference exposure area 32 is read out by the area CCDs 96A, 96B. That is, the reflected light of the B layer is detected by the area CCD 96A, and the reflected light of the R layer and the transmitted light of each layer are detected by the area CCD 96B.

The detected signals are amplified by the amplifier circuits 128A, 128B, converted to digital data by the A/D converters 130A, 130B, outputted to the brightness and darkness correction sections 134A, 134B via the CDSs 132A, 132B, and are subjected to brightness and darkness correction processing by the brightness and darkness correction sections 134A, 134B.

The image data which has been subjected to brightness and darkness correction processing are outputted to the frame memory of the image processing apparatus 22, and are outputted to the control section 140. The CPU 142 of the control section 140 determines the conversion characteristic f1 for converting from the R reflection density to the R transmission density from the reflected light read data of the R single color exposure area in the reference exposure area 32 and the transmission light reading data, and determines the conversion characteristic f2 for converting the B reflection density to the B transmission density from the reflected light read data of the B single color exposure area in the reference exposure area 32 and the transmission light read data, and sets the conversion characteristics f1, f2 in the LUT 158.

Next the CPU 142 calculates the color mixing coefficient from the transmission density data of each single color exposure area determined by the conversion characteristics f1, f2, calculates the inverse matrix of the matrix comprising the color mixing coefficient so as to determine the color correction coefficient, and outputs the same to the MTX circuit 160. Next, the CPU 142 determines the conversion characteristic f3 from the gray exposure area read data of the reference exposure area 32 and a predetermined target gray density, and sets the same in the LUT 162.

Accordingly, the parameters for carrying out corrections such as the color correction and the gray balance are calculated based on the reference exposure data, and are set in the image processing section 138.

When the operation of reading the reference exposure area 32 is finished, the image frame 1 is positioned so as to be on the optical axis L so that the reading of the image frame 1 is carried out similarly to the reading of the reference exposure area 32, and the image data is outputted to the image processing apparatus 22.

Then, image processing is carried out in the image processing section 138 under the conditions set by the control section 140. That is, the inputted data of the R image and the B image are each subjected to log conversion by the LUT 158, and the converted data are converted to the transmission density data according to the conversion characteristics f1, f2.

Next, the inputted image data are subjected to color correction in the MTX circuit 160 by the color correction coefficient so as to calculate data for R, G, B without color mixing. Then, the gray balance correction and the contrast correction are carried out by the LUT 162 with the conversion characteristic f3 as the reference of the gradation conversion characteristics. If necessary, the gray balance correction may include the gradation balance correction by the light source correction coefficient.

The image data, for which gray balance correction and contrast correction have been carried out, are enlarged or reduced by a predetermined ratio by the enlarging/reducing section 164, are subjected to dodging processing by the automatic dodging section 166, and are subjected to sharpness enhancement processing by the sharpness enhancement section 168.

The image data which have been subjected to image processing in this manner are converted to image data to be displayed on the monitor 154 by the 3DLUT color conversion section 170, as well as are converted to image data to be printed on a printing paper in the printer section 24 by the 3DLUT conversion section 172.

The image data which have been subjected to these image processings are exposed on a printing paper by the printer section 24. The printing paper with the image exposed thereon according to the image data is fed to the processor section 26 so as to be subjected to color developing, bleaching fixing, washing with water, and drying processes. Accordingly, the image exposed and recorded on the printing paper is made visible. The images recorded on the image frames are read out successively and are subjected to image processings and are printed on a printing paper.

As described above, in the present embodiment, since the unexposed area provided on the leading end part of the APS film is subjected to reference exposure by light of each color and the color correction and the gradation conversion characteristic correction are carried out based on the read data of the area subjected to reference exposure, even in the case of applying black and white development to a color photographic film, color reproduction and gradation reproduction can be realized appropriately regardless of the type of the film, the aging, and the change of the developing conditions.

Moreover, since the common area CCD is used for the transmission reading and the reflection reading of the R layer, the configuration can be simplified and the positioning of the reading means can be simplified.

In the case of a 135 film, since the unexposed area to be used freely by the user is not defined as is the case with an APS film, the top frame position cannot be detected without development. Therefore, there is the risk of exposing the leading frame inadvertently when carrying out reference exposure as mentioned above, and thus it is not preferable.

Therefore, in the case of a 135 film, the image processing conditions such as the color correction conditions and the gradation correction conditions, and the reading control conditions such as the light source light amount, the light source lighting time, and the area CCD charge accumulating time are set preliminarily for each type of film, or each channel in which a plurality of types of films are grouped together. The conditions are stored in the hard disc 150 and the DX code is read out by the DX code reading sensor 114. Image reading or image processing is carried out in accordance with the image processing conditions and the reading control conditions corresponding to the DX code.

Figure 20:
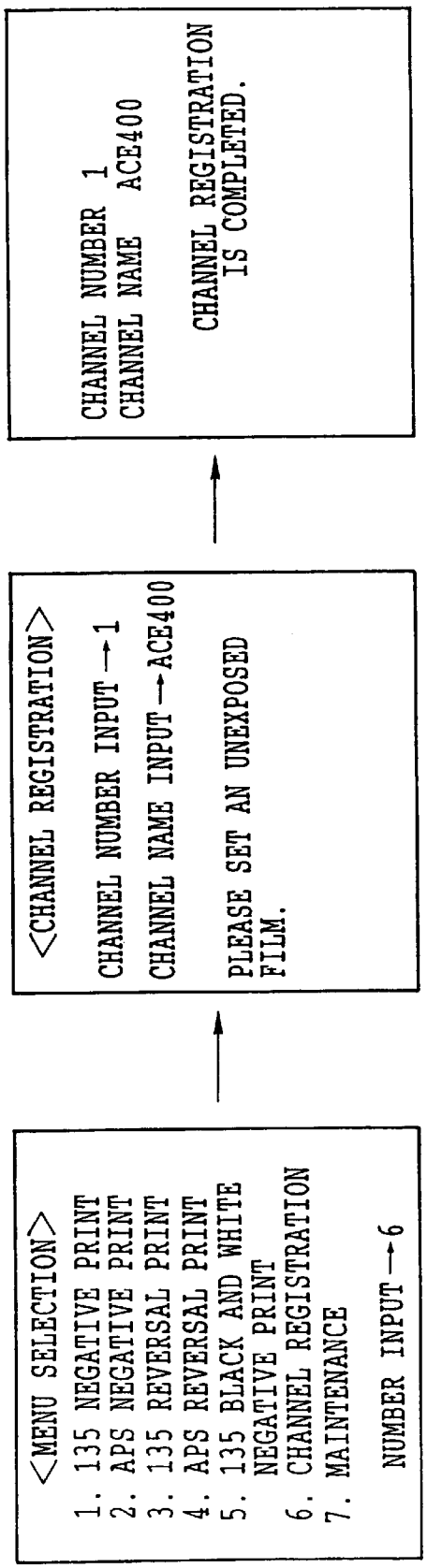
FIG. 20 is a schematic diagram of a screen configuration for channel registration.

These conditions are set, for example, as follows. That is, as shown in FIG. 20, with the menu indicated on the monitor 156, when an operator selects the channel registration of No. 6 from the menu, the channel registration screen is displayed. The operator requests the input of the channel number and the channel name, and setting of an unexposed film. Here, if the operator sets an unexposed film on the apparatus and inputs an arbitrary channel number and channel name, the above-described reference exposure is carried out by the reference exposure section 14 so as to calculate the image processing conditions and the reading control conditions and store the calculated conditions in the hard disc 150.

Moreover, among 135 films, for those without a DX code or those with a low usage ratio, the unexposed portion is read out for calculating the image processing conditions and the reading control conditions from the reading data. Since the gray balance condition of the film is reflected substantially appropriately in the unexposed portion in most cases, by setting the LUT 162 so as to have the unexposed portion read data coincide with the target gray value, the gray balance can be substantially corrected. Since the unexposed portion of the color photographic film after black and white development differs significantly depending on the type of the film, using the unexposed portion read data is particularly effective. However, since gradation balance irregularity and contract cannot be corrected thereby, for the gradation conversion characteristic f3 and the color correction coefficient, a default value needs to be used, or automatic setting from the image data of the frame images is needed.

Figure 21:
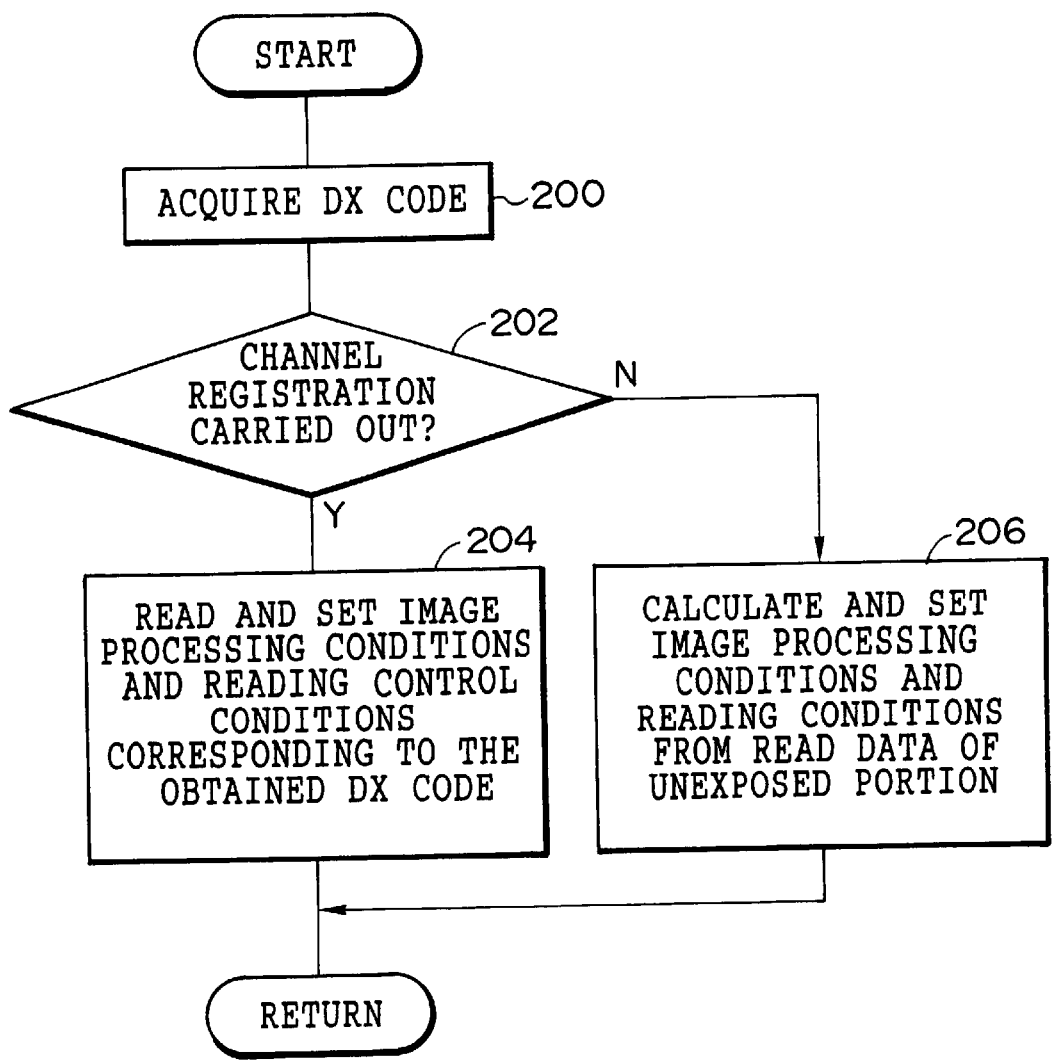
FIG. 21 is a flow chart showing the flow of control for determining processing conditions in the case of processing a 135 film.

That is, processing of a 135 film is as follows. For example, as shown in FIG. 21, the DX code is obtained in the step 200. Whether or not a channel corresponding to the DX code is registered, that is, whether or not the image processing conditions and the reading conditions corresponding to the DX code are stored in the hard disc 150, is judged in the next step 202.

Then, in the case the channel is judged to be registered, the answer to the determination in step 202 is affirmative, and in step 204, the image processing conditions and the reading conditions corresponding to the obtained DX code are read out from the hard disc 150 and are set in the image processing section 138.

In contrast, in the case the channel is judged to be not registered, the answer to the determination in step 202 is negative. In step 206, the unexposed portion is read out, the reading control conditions are calculated from the reading data, and the image is read in accordance with the reading conditions.

As mentioned above, if the channel is registered, although aging or changes in the developing conditions cannot be addressed, correction can be carried out in accordance with the characteristic difference depending on the type of the film.

The color correction coefficient expressing the color correction conditions in the image processing can be determined in advance, for example, as follows. That is, an undeveloped film with a plurality of (for example, two frames of) latent images of the same design formed is prepared by continuously photographing the same subject with the same camera using a commercially available color negative film. It is preferable to photograph in the two conditions of standard exposure and overexposure in order to see the influence of the film density on image quality.

One of the frames is developed with a black and white developer, and after development, is dried without bleaching, fixing, or washing with water so as to obtain a black and white developed film. The black and white developed film is colored in black and white, and thus does not seem to have the color information at first sight. However, the image of the black and white developed film read out from the back side and the image read out from the front side differ, and the color information is included. The other frame is developed with a color developer, and after the development, is subjected to bleaching, fixing, washing with water and drying so as to obtain a color developed film. The image of the color developed film serves as the target image.

Next, the image recorded on the black and white developed film is read out by the film scanner from three directions. That is, with light (in the present embodiment, IR light) irradiated onto the emulsion layer side and the supporting member side of the black and white developed film, the reflected images of the upper photographic photosensitive layer (B layer) and of the lower photographic photosensitive layer (R layer) are read out respectively by the light reflected thereby. The transmitted image, in which are combined the images of the photographic photosensitive layer of the B layer, the photographic photosensitive layer of the R layer, and the photographic photosensitive layer of the intermediate layer (G layer), is read out by the light transmitted through the black and white developed film.

Then, the data Br, Rr, RGBt of the reflected images of the B layer and the R layer and the transmitted image of the RGB layers are taken out for correcting the pixel coordinates so as to superimpose the three images. In particular, since the R layer reflected image is reversed at the time of reading, it is superimposed after the left and right sides thereof are reversed. The images are superimposed by setting a reference point in the images for rotation conversion and parallel movement of the images such that the coordinates of the reference points can coincide. The data Br, Rr, RGBt, which are taken out from the film scanner and which are subjected to coordinate conversion for the superimposition, are subjected to linear conversion by a converter for converting the gray scale to the linear, and are inputted to a regression calculation apparatus as the data Br', Rr', RGBt'.

Moreover, the image recorded in each photographic layer of the color developed film is separated into three colors and read out by the film scanner as the transmitted image. The read data R, G, B are each subjected to linear conversion by the converter so that the data R', G', B' are inputted to the regression calculation apparatus as the target values.

In the regression calculation apparatus, the regression analysis is executed so as to have the linearly-converted data Rr', RGBt', Br' of the three layers coincide with the target values R', G', B' for calculating the parameters. Since the data Rr', RGBt', Br' read out from the black and white developed film are not separated into the color components (RGB components), the process for separating into the color components is executed with the color of the image recorded on the color developed film as the standard.

That is, in the regression calculation apparatus, for each of the R, G, B three colors, 10 parameters ak to jk (k=1, 2, 3, wherein 1 denotes R, 2 denotes G, and 3 denotes B, respectively) as shown in the following formula are set, and the parameters of a 3×10 matrix for converting Rr', RGBt', Br' into the target values R', G', B' are determined by statistic calculation.

Formula (3) is as follows:

$$R' = a1Rr' + b1RGBt' + c1Br' + d1Rr'^2 + e1RGBt'^2 +$$
$$f1 \cdot Br'^2 + g1Rr' \cdot RGBt' + h1RGBt' \cdot Br' +$$
$$i1Br' \cdot Rr' + j1$$

$$G' = a2Rr' + b2RGBt' + c2Br' + d2Rr'^2 + e2RGBt'^2 +$$
$$f2 \cdot Br'^2 + g2Rr' \cdot RGBt' + h2RGBt' \cdot Br' +$$
$$i2Br' \cdot Rr' + j2$$

$$B' = a3Rr' + b3RGBt' + c3Br' + d3Rr'^2 + e3RGBt'^2 +$$
$$f3 \cdot Br'^2 + g3Rr' \cdot RGBt' + h3RGBt' \cdot Br' +$$
$$i3Br' \cdot Rr' + j2.$$

Although the parameter matrix is a 3×10 matrix in the above example, a 3×3 matrix or a 3×9 matrix can be used as well.

Accordingly the above-mentioned parameters are calculated for each film type. The obtained parameters are stored in the hard disc 150, and a 3×10 matrix corresponding to the type of the film to be processed is outputted to the MTX 160 as the color correction coefficient. Accordingly, the color correction is carried out in the MTX 160.

Although a structure using an area CCD is explained in the present embodiment, the present invention can be applied to a structure using a line CCD. In this case, the sub scanning speed including the conveyance speed of the photographic film 28 should be controlled as a reading control condition according to the charge accumulating time.

Although the example of forming a silver image by the black and white development is explained above, the silver image may include the dye image information as long as it is substantially a silver image, i.e., as long as 60% or more of the image density derives from the developed silver, it can be adopted. Therefore, a silver image including dye information obtained by subjecting a color film to color development can be used.

In the case a color film is subjected to the color development, only the silver image can be read out from the silver image including the dye information by using an infrared light without reading the dye information. It is also possible to read out the dye information by providing a light source for the upper layer for irradiating, onto the upper photographic photosensitive layer, light of the complementary color of the dye contained in the silver image in the upper photographic photosensitive layer; a light source for the lower layer for irradiating, onto the lower photographic photosensitive layer side, light of the complementary color of the dye contained in the silver image in the photographic photosensitive layer of the lower layer; a light source for the intermediate layer for irradiating, on to the upper photographic photosensitive layer side or the lower photographic photosensitive layer side, light of the complementary color of the dye contained in the silver image in the photographic photosensitive layer of the intermediate layer; and a reading sensor for reading out the image information by light reflected from the upper layer and the lower layer of the color photographic film, and light transmitted through the color photographic film. Specifically, by using the R light to detect the reflected light, the image information related to the cyan dye image and the silver image in the red-light-photosensitive layer can be obtained. By using the G light to detect the transmitted light, the image information including the image information related to the magenta dye image and the silver image in the green-light-photosensitive layer can be obtained. By using the B light to detect the reflected light, the image information related to the yellow dye image and the silver image in the blue-light-photosensitive layer can be obtained.

As heretofore explained, according to the present invention, the appropriate color reproduction can be achieved even for an image recorded on a color photographic photosensitive material which is processed such that a silver image is formed.

A second embodiment of the present invention will be explained. The same components as in the first embodiment are denoted by the same numerals, and further explanation thereof is not given.

Like the first embodiment, also in the second embodiment, the photographic film 28 is conveyed by the film carrier 86 so as to be positioned at a position (reading position) with the image surface center of the image provided on the optical axis L. Moreover, with the image positioned at the reading position, the scanner control section 104 rotates the turrets 122, 108 so as to have the opening portion 124 of the reflecting plates 118A, 118B for brightness correction and the opening portion 110 of the ND filter 106 for brightness correction each on the optical axis L. The scanner control section 104 sets the charge accumulating times t11, t12, t13 of the area CCDs 96A, 96B corresponding to predetermined reading conditions in the CCD drivers 102A, 102B. The area CCDs 96A, 96B carry out photoelectric conversion on the reflected light from the emulsion surface side (B layer side) of the photographic film 28, the reflected light from the base surface (R layer side), and the transmitted light transmitted through the photographic film 28 by the set charge accumulating times so as to accumulate the charges which have been subjected to photographic conversion.

The CCDs have a better S/N ratio in reading in a bright condition in the area having a linearity in the output signal thereof, and a poor S/N ratio in reading in a dark condition. Therefore, it is preferable to set the reading conditions so as to have the brightest point of the read out image close to the saturated point (the brightest point in the state range of having the linearity). However, such setting has been difficult in reflection reading.

Therefore, in the present embodiment, in the reflection reading, during the charge accumulation, the pixel displacement is executed in the X1 direction, the Y1 direction, the X2 direction and the Y2 direction successively as shown in FIG. 24B. That is, the charge of the area surrounded by the solid line in FIG. 24B is accumulated. Accordingly, substantially only ¼ of the light amount is needed so that the reading condition can be set with the brightest point of the read out image close to the saturated point of the CCD, without irradiating a large amount of light, and the S/N ratio can be improved. Furthermore, the apparent opening of the light receiving part of the CCD can be widened so that aliasing can be suppressed. In the case of transmission reading, ordinary pixel displacement is executed for reading at a high resolution.

Figure 22:
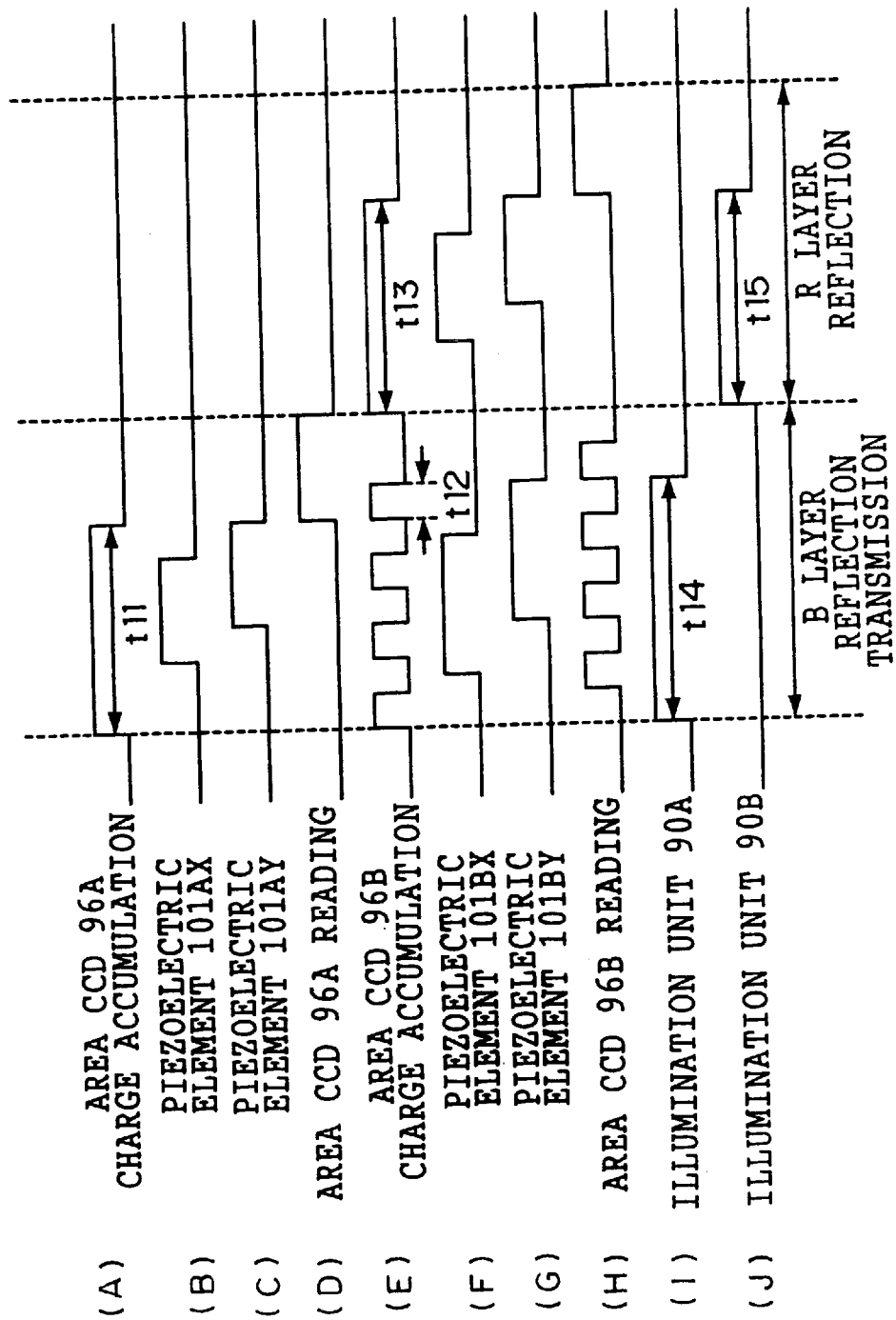
FIG. 22 is a timing chart showing the image reading timing according to the second embodiment of the present invention.

That is, as shown in FIG. 22I, when the illumination unit 90A is lit by the scanner control section 104, IR light is irradiated to the B layer side of the photographic film 28, and the light beam reflected by the B layer of the photographic film 28 is detected by the area CCD 96A as shown in FIG. 22A (specifically, the photoelectrically-converted charge is accumulated). During the charge accumulation, the piezoelectric driver 99A vibrates the piezoelectric elements 101AX, 101AY as shown in FIGS. 22B, 22C so as to move the area CCD 96A in the X1 direction, the Y1 direction, the X2 direction, and the Y2 direction successively as shown in FIG. 24B. The charge accordingly accumulated is read out from the area CCD 96A as a signal representing the reflected light amount as shown in FIG. 22D.

Moreover, at the same time, the piezoelectric driver 99B vibrates the piezoelectric elements 101BX, 101BY as shown in FIGS. 22F, 22G so as to move the area CCD 96B in the X1 direction, the Y1 direction, the X2 direction, and the Y2 direction successively as shown in FIG. 24C. At each movement, the light transmitted through the photographic film 28 is detected (specifically, photoelectrically converted) by the area CCD 96B as shown in FIG. 17E and is read out from the area CCD 96B as a signal representing the reflected light amount as shown in FIG. 22H.

When the detection of the transmitted light and the reflected light of the R layer is finished as shown in FIG. 22J so that the illumination unit 90B is lit by the scanner control part 104, IR light is irradiated to the base layer side of the photographic film 28, and the light reflected by the R layer of the photographic film 28 is detected (specifically, photoelectrically converted) by the area CCD 96B as shown in FIG. 22E. During the charge accumulation, the piezoelectric driver 99B vibrates the piezoelectric elements 101BX, 101BY as shown in FIGS. 22F, 22G so as to move the area CCD 96B in the X1 direction, the Y1 direction, the X2 direction, and the Y2 direction successively as shown in FIG. 24B. The charge accordingly accumulated is read out from the area CCD 96B as a signal representing the reflected light amount as shown in FIG. 22H.

In this way, the light reflected by the R layer and the B layer is read out at a low resolution, and the transmitted light is read out at a high resolution.

The light amount of the light irradiated by the illumination units 90A, 90B, the lighting times t14, t15, and the charge accumulating times t11, t12, t13 by the area CCDs 96A, 96B are set optimally by the set up calculation by the control section 140, in accordance with the type of the film or the like.

Figure 23:
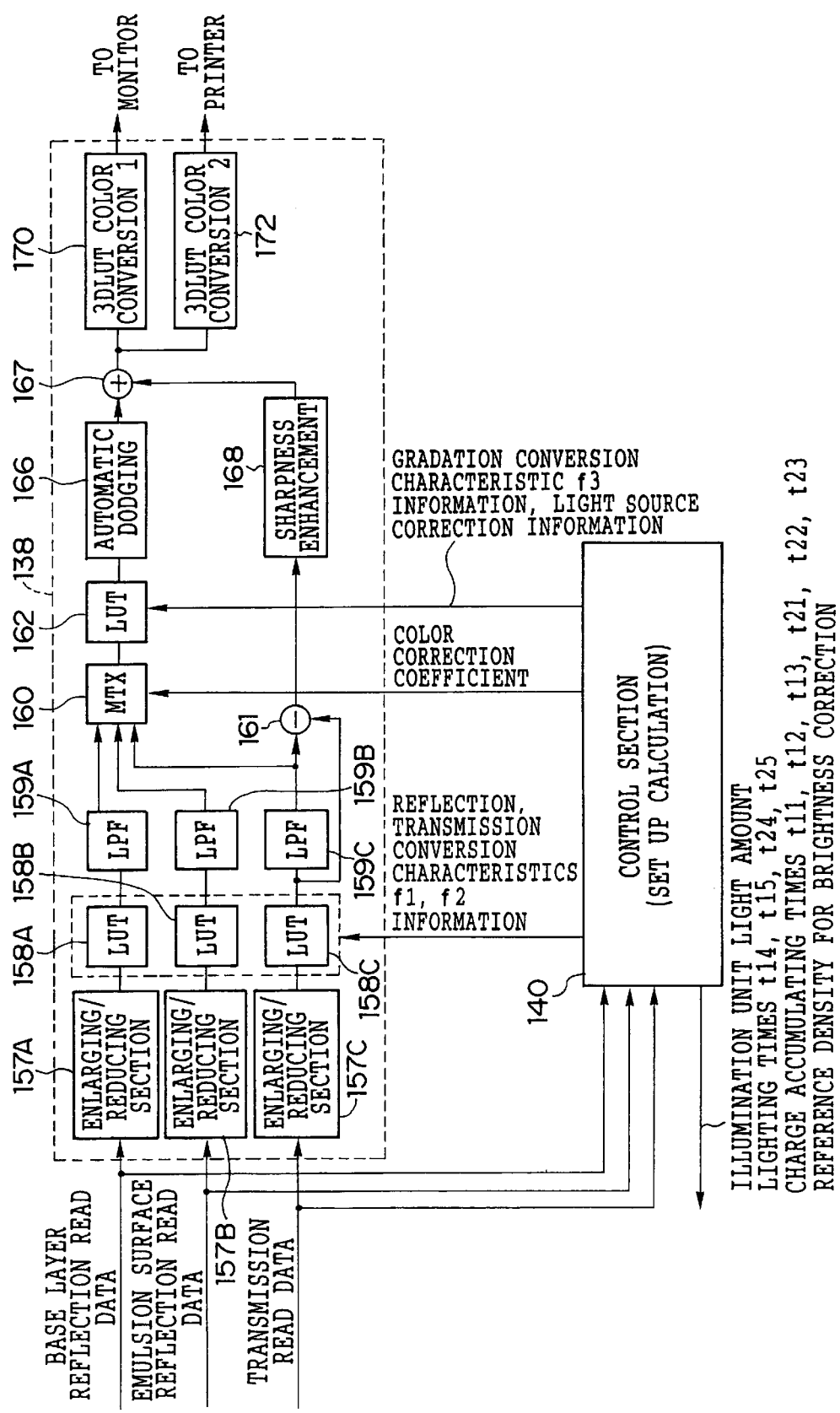
FIG. 23 is a schematic structural view of an image processing section according to the second and third embodiments of the present invention.

Similarly to the first embodiment, image data processing is executed so that the image data inputted from the film scanner 20 are stored in the frame memory 136. The image data inputted in the frame memory 136, that is, the base layer reflection reading data, the emulsion surface reflection reading data, and the transmission reading data, are outputted to the image processing section 138 and the control section 140 as shown in FIG. 23.

The image processing section 138 executes various types of image processes according to the processing conditions determined for each image and notified by the control section 140. Since the base layer reflection reading data and the emulsion surface reflection reading data are read out at a low resolution and the transmission data are read out at a high resolution, first, the pixel positions and the image sizes of the data are matched by enlarging/reducing sections 157A, 157B, and 157C. In a case in which electronic magnification changing is carried out in the enlarging/reducing section 157C on the transmission reading data which has been inputted with an electronic variable magnification of m, the electronic magnification changing is executed in the enlarging/reducing sections 157A, 157B with an electronic variable magnification of 2m. Accordingly, the pixel positions and the image size of the base layer reflection read data and emulsion surface reflection read data read out at a low resolution and the transmission read data read out at a high resolution can be matched.

Next, in the same way as in the first embodiment, the conversion characteristics f1 and f2 are determined in the CPU 142 of the control section 140.

The control section 140 outputs the data of the determined conversion electronic characteristics f1, f2 to the LUTs (look up tables) 158A, 158B of the image processing section 138. The LUTS 158A, 158B subject the inputted read data of the R image and the B image to the log conversion so as to obtain reflection density data, and converts the converted reflection density data to transmission density data by the conversion characteristics f1, f2. The operation of converting to the transmission density after determining the conversion characteristics is executed because light passes through a layer twice in the intermediate density range so that the reflection density becomes about twice as much as the transmission density, and thus the reflection density and the transmission density are in a non-linear relationship in a high density range such as the density saturation. Thus, appropriate correction of the gray balance or the like in the case that reflection reading and transmission reading are both executed is not possible. In the LUT 158C, the inputted transmission read data are subjected to log conversion so as to obtain the transmission density data.

The low frequency components of the transmission density data obtained in this way are extracted by LPFs (low pass filters) 159A, 159B, 159C and outputted to the MTX (matrix) circuit 160. The transmission read data from which the low frequency component has been extracted by the LPF 159C is outputted also to a subtracting section 161. The subtracting section 161 subtracts the transmission read data of the low frequency component outputted from the LPF 159C from the transmission density data before extraction of the low frequency component outputted from the LUT 158C so as to obtain the transmission density data of the high frequency component.

The transmission density data of the high frequency component is subjected to graininess suppressing processing and the sharpness enhancing processing by the sharpness enhancing section 168. Since sharpness enhancement processing is executed using only the data from the transmission reading signal without using the data from the reflection reading signal, an image having good sharpness can be obtained. Moreover, since the high frequency component signal is obtained from the transmission reading signal obtained from the area CCD 96B, color offset can be suppressed.

For the graininess enhancement processing process and the sharpness enhancement processing, a method of realizing unsharp masking processing by a non-linear LUT can be used. As shown in FIG. 25, by cutting a signal whose absolute value is smaller than a predetermined threshold value th in an input signal, graininess can be suppressed. By making the ratio of an input signal, whose absolute value is thereof the same as or larger than the threshold value th, and an output signal, that is, the slope, 1 or more, the sharpness is enhanced. Moreover, by using, for example, the method disclosed in Japanese Patent Application Laid-Open (JP-A) No. 9-22460, suppression of graininess and enhancement of sharpness can be executed with higher accuracy.

The high frequency component signal which has been subjected to sharpness enhancement processing is combined with a low frequency signal subjected to the processes (to be described later) carried out by the MTX circuit 160, the LUT 162, and the automatic dodging section 166 by an adding section That is, given that the original signal of the transmission density data is S and the low frequency component signal is U, the image signal S' after correction can be represented by the following formula:

$$S'=U+f(S-U) \quad (4).$$

Here, the function f is a function as shown in FIG. 25, in which a signal whose absolute value is smaller than a predetermined threshold th in an input signal having been cut, and in which the ratio of an input signal, whose absolute value is the same as or larger than the threshold th, and an output signal being 1 or more.

Figure 27:
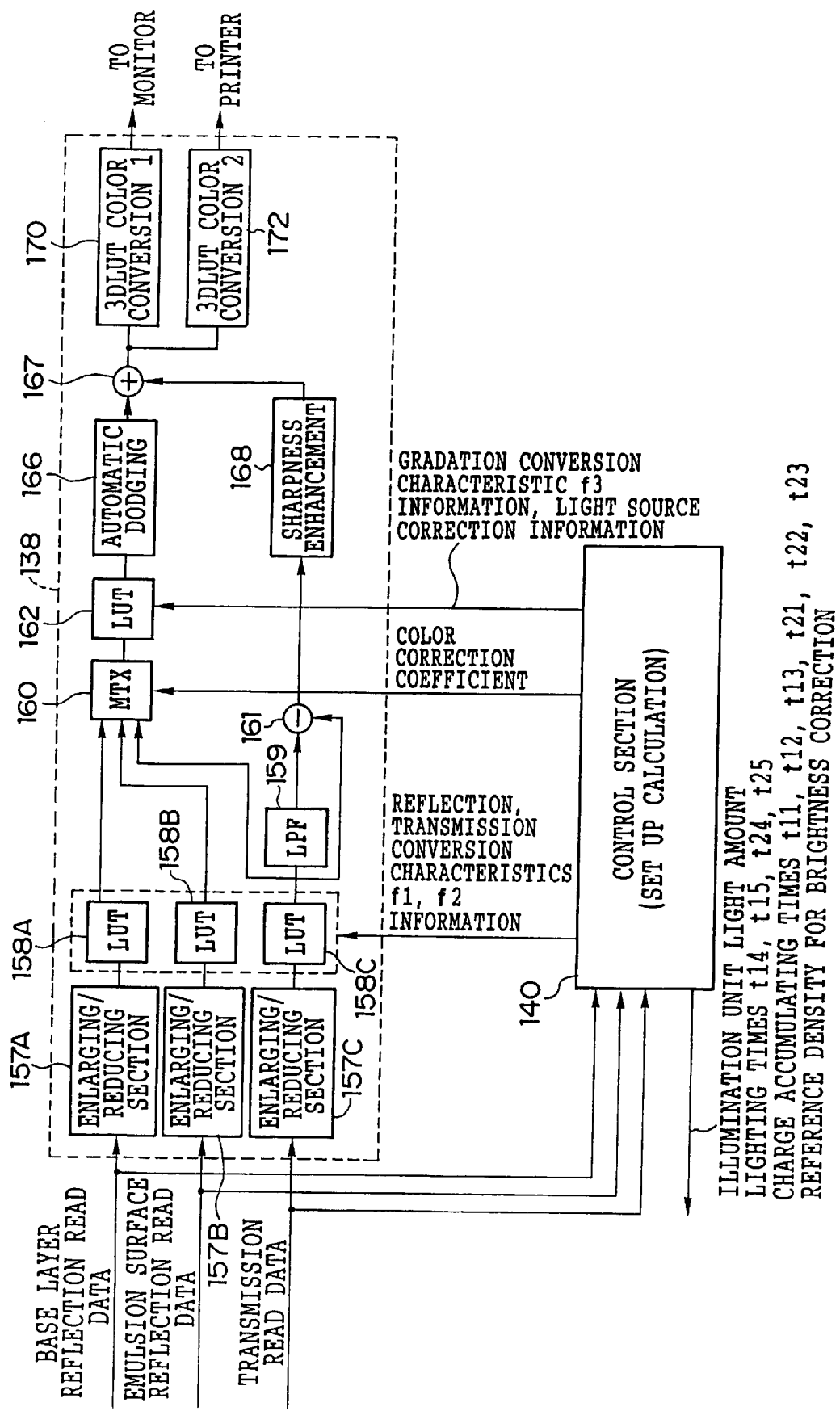
FIG. 27 is a schematic structural view of an image processing section according to the second and third embodiments of the present invention.

Moreover, the image signal S' after correction can also be obtained as follows. That is, as shown in FIG. 27, the signal from the LUTs 158A to 158C is outputted directly to the MTX 160, and only the low frequency component signal is removed by the LPF 159 from the original signal outputted from the LUT 158C. Then, the low frequency component signal is subtracted from the original signal outputted from the LUT 158C by the subtracting section 161, and sharpness enhancement is carried out on the removed high frequency component signal by the sharpness enhancement section 168. The high frequency component signal which has been subjected to sharpness enhancement is, by the adding section 147, combined with a low frequency signal which has been subjected to processes (to be described later) which are carried out by the MTX circuit 160, the LUT 162, and the automatic dodging section 166.

In this case, the image signal S' after correction can be represented by the following formula:

$$S'=S+f(S-U) \quad (5).$$

In contrast, in a similar way as in the first embodiment, the gray balance correction and the contrast correction are carried out from the transmission read data.

The image data which has been subjected to gray balance correction and contrast correction is subjected to dodging processing by the automatic dodging section 166. Then, the low frequency component image data which has been subjected to automatic dodging processing are, by the adding section 147, combined with the high frequency component image data which has been subjected to sharpness enhancement in the sharpness enhancing section 168. The LPF 159, the subtracting section 161, the adding section 167, and the sharpness emphasizing section 168 correspond to the generating means according to the present invention.

The image data accordingly which have been subjected to image processings in this way are converted to image data to be displayed on the monitor 154 by a 3D (three-dimensional) LUT color conversion section 170 as well as to image data to be printed on a printing paper in the printer section 24 by a 3DLUT conversion section 172.

Similar to the first embodiment, the operation of the present embodiment will be explained with an example of a case of processing an APS film.

Like the first embodiment, the central portion of the reference exposure area 32 of the photographic film 28 which has been subjected to black and white development is positioned on the optical axis L.

Then, the turrets 108, 122 are rotated so as to have the opening portion 110 of the ND filter 106 for brightness correction and the opening portion 124 of the reflection plates 118A, 118B for brightness correction on the optical axis L by the scanner control section 104.

Next, the scanner control section 104 sets the charge accumulating times t11, t12, t13 for the CCD drivers 102A, 102B, and lights the illumination units 90A, 90B for the lighting times t14, t15 so as to irradiate IR light onto the photographic film 28. Accordingly, the reference exposure area 32 is read out by the area CCDs 96A, 96B. That is, the reflected light of the B layer is detected by the area CCD 96A, and the reflected light of the R layer and the transmitted light of each layer are detected by the area CCD 96B.

The detected signals are amplified by the amplifier circuits 128A, 128B, converted to digital data by the A/D converters 130A, 130B, outputted to the brightness and darkness correction sections 134A, 134B via the CDSs 132A, 132B, and subjected to brightness and darkness correction processing by brightness and darkness correction sections 134A, 134B.

The image data applied subjected to brightness and darkness correction processing are outputted to the frame memory of the image processing apparatus 22, and are outputted to the control section 140. The CPU 142 of the control section 140 determines the conversion characteristic f1 for converting from the R reflection density to the R transmission density from the reflected light read data of the R single color exposure area in the reference exposure area 32 and the transmission light read data, and the conversion characteristic f2 for converting the B reflection density to the B transmission density from the reflected light read data of the B single color exposure area in the reference exposure area 32 and the transmission light read data, and sets the determined conversion characteristics f1, f2 in the LUTs 158A, 158B.

Next the CPU 142 calculates the color mixing coefficient from the transmission density data of each single color exposure area determined by the conversion characteristics f1, f2, calculates the inverse matrix of the matrix comprising the color mixing coefficient so as to determine the color correction coefficient, and outputs the same to the MTX circuit 160. Next, the CPU 142 determines the conversion characteristic f3 from the gray exposure area read data of the reference exposure area 32 and a predetermined target gray density, and sets the same in the LUT 162.

Accordingly, the parameters for executing the corrections such as color correction, gray balance correction and contrast correction are calculated based on the reference exposure data, and are set in the image processing section 138.

When the operation of reading the reference exposure area 32 is finished, the image frame 1 is positioned so as to be on the optical axis L and the operation of reading the image frame 1 is carried out. That is, the reflection reading of the photographic film 28 on the base surface side is executed at a low resolution by the area CCD 96A, the reflection reading of the photographic film 28 on the base surface side is executed at a low resolution by the area CCD 96B, and the transmission reading on the base surface side is executed at a high resolution. These read data are subjected to brightness and darkness processing and the like, and are outputted to the image processing apparatus 22.

In the image processing apparatus 22, first, the pixel positions and the image sizes of the data are matched by the enlarging/reducing sections 157A, 157B, and 157C. In the case that electronic magnification changing is carried out in the enlarging/reducing section 157C for the transmission read data inputted with an electronic variable magnification of m, electronic magnification changing is carried out in the enlarging/reducing sections 157A, 157B with an electronic variable magnification of 2m. Accordingly, the pixel positions and the image sizes of the base layer reflection read data read out at a low resolution and the transmission read data read out at a high resolution can be matched.

Then, image processings are carried out by the image processing section 138 under the conditions set by the control section 140. That is, the inputted reflection density data of the R image and the B image are each subjected to log conversion by the LUTs 158A, 158B, and the converted data are converted to transmission density data according to the conversion characteristics f1, f2. Moreover, the inputted transmission read data are subjected to the log conversion by the LUT 158C.

Next, the low frequency components of the transmission density data are extracted by the LPFs 159A, 159B, 159C and outputted to the MTX circuit 160. The transmission read data from which the low frequency component has been extracted by the LPF 159C are outputted also to the subtracting section 161. The subtracting section 161 subtracts the transmission read data of the low frequency component outputted from the LPF 159C from the transmission density data before the extraction of the low frequency component outputted from the LUT 158C, so as to obtain the transmission density data of the high frequency component. The transmission density data of the high frequency component are subjected to graininess suppressing processing and enhancement processing by the sharpness enhancement processing by the sharpness enhancement section 168.

In contrast, the image data of the low frequency component are subjected to color correction with the color correction coefficient by the MTX circuit 160 so as to calculate R, G, B data without color mixing. The LUT 162 carries out gray balance correction and contrast correction with the conversion characteristic f3 as a reference for the gradation conversion characteristics. The gray balance correction may, if necessary, include gradation balance correction carried out by using the light source correction coefficient.

The image data subjected to gray balance correction are enlarged or reduced by a predetermined magnification by the enlarging/reducing section 164, and are subjected to dodging processing by the automatic dodging section 166. The low frequency component image data subjected to the automatic dodging processing are, by the adding part 167, combined with the high frequency image data which has been subjected to sharpness enhancement processing by the sharpness enhancement section 168.

The image data subjected to image processings in this way are converted to image data to be displayed on the monitor 154 by the 3DLUT color conversion section 170 as well as converted to image data to be printed on a printing paper in the printer section 24 by the 3DLUT conversion section 172.

The image data subjected to the image processing are exposed on a printing paper by the printer section 24. The printing paper with the image exposed thereon according to the image data is fed to the processor section 26 so as to be subjected to color developing, bleaching fixing, washing with water, and drying processes. Accordingly, the image exposed and recorded on the printing paper is made visible. The images recorded on the image frames are read out successively, undergo image processings, and are printed on a printing paper.

Since the pixel displacement is executed during the charge accumulation in the reflection reading in the present embodiment, substantially only ¼ of the light amount is needed so that the reading conditions can be set so as to have the brightest point of the read out image close to the saturated point of the CCD, without irradiating a large amount of light, and the S/N ratio can be improved. Furthermore, the apparent opening of the light receiving portion of the CCD can be widened so that the aliasing can be suppressed.

Moreover, since the sharpness enhancement processing is executed using only the data from the transmission reading signal without using the data from the reflection reading signal at the time of the reflection reading, an image can be obtained with a better sharpness. Moreover, since the high frequency component signal is obtained from the transmission reading signal obtained from the area CCD 96B, color offset can be suppressed.

The B image density is a high density due to the inherent absorption of the silver halide. Moreover, the reading load is considered to be lighter in the reflection reading than in the transmission reading because of the residual yellow filter, or the like. Thus, reflection reading it is effective in cases in which reading without fixation and bleaching is preferable for achieving a higher speed in color development.

Figure 26A:
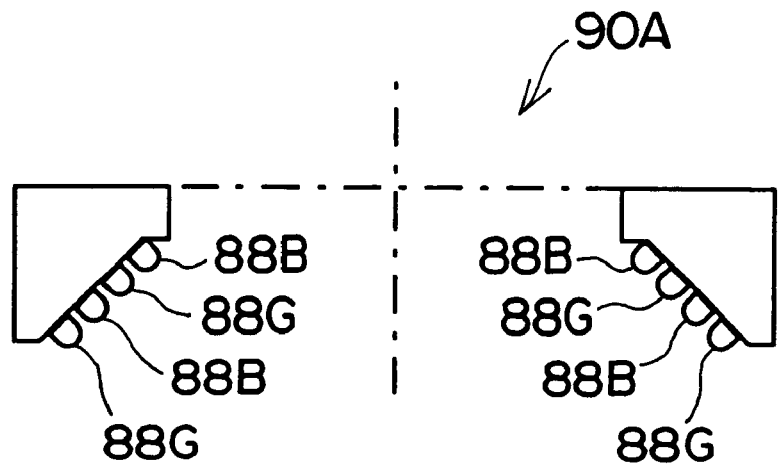
FIGS. 26A and 26B are side views of an illumination unit according to the second and third embodiments of the present invention.
Figure 26B:
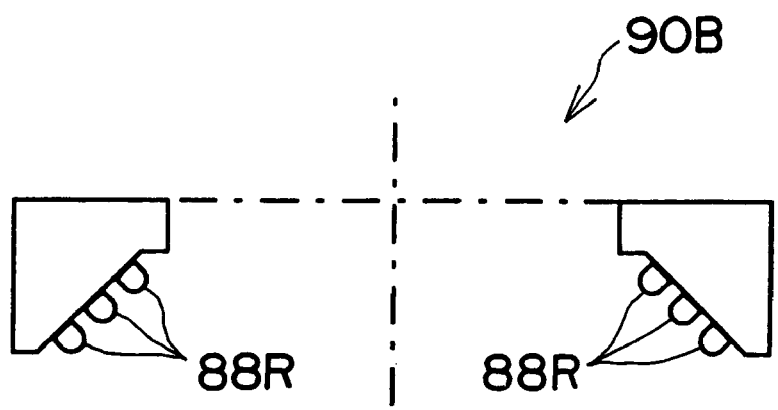

In this case, the illumination units 90A, 90B can be provided as follows. The illumination unit 90A can comprise LEDs 88B for emitting B light and LEDs 88G for emitting G light disposed in a ring-like configuration as shown in FIG. 26A, the LEDs 88B and the LEDs 88G may be lit alternately, and the illumination unit 90B can comprise LEDs 88R for emitting an R light beam disposed in a ring-like configuration. In the image processing section 138, the base surface reflection read data shown in FIG. 23 may be replaced by the R light reflection read data, the emulsion surface reflection read data may be replaced by the B light reflection read data, and the transmission read data may be replaced by the G light read data.

Moreover, although a structure using an area CCD is explained in the present embodiment, the present invention can be adopted in a structure using a line CCD. In this case, a line CCD having a surface area of photodiodes larger than that of the line CCD for the transmission reading is used as the reflection reading line CCD. Accordingly, a sensitivity which is four times as much as that of the transmission reading line CCD can be obtained, so that the light amount can be made to be ¼. Moreover, the accumulated charge of the adjacent odd-numbered pixel and even-numbered pixel can be synthesized and read. Accordingly, the resolution becomes ½, and the light amount can be made to be ½. Furthermore, an addition averaging process can be applied to the reflection reading data after the A/D conversion. Accordingly, the S/N ratio can be improved by 3 db. In the above-mentioned case, in the case the number of transmission reading line CCD pixel number is 2,000 pixels, the reflection reading main scan is 1,000 pixels and the transmission reading main scan is 2,000 pixels.

It is also possible to use a common line CCD for R layer reflection reading line CCD and G layer transmission reading line CCD and alternately the light sources for emitting R light and G light. Or, it is possible to provide independent line CCDS, a filter for transmitting only R light, and a filter for transmitting only G light, and to light the light sources for emitting R light, and G light at the same time.

As heretofore explained, according to the present invention, since the image information is generated by the generating means based on the high frequency component information extracted from the transmission image information and the low frequency component information extracted from the reflection image information, an effect of appropriately applying different image processes to the high frequency component information and the low frequency component information, for example, a sharpness process to the high frequency component and a color correction process to the low frequency component information, can be achieved.

Hereinafter, a third embodiment of the present invention will be explained which is adopted in an image reading apparatus for reading a dye image and a silver image recorded on a color photographic film before or after drying, after subjecting the color photographic film to color development so as to produce a dye image and a silver image, and drying without bleaching or fixation after the development. In the case of color development, a light source of various types of wavelengths including red color light (R light), green color light (G light), and blue color light (B light) can be used. However, in the present embodiment, a case of reading a silver image and the dye image using infrared light (IR light) and G light will be explained. The same components as in the first and second embodiments are denoted by the same numerals, and further explanation thereof is not given.

Figure 28:
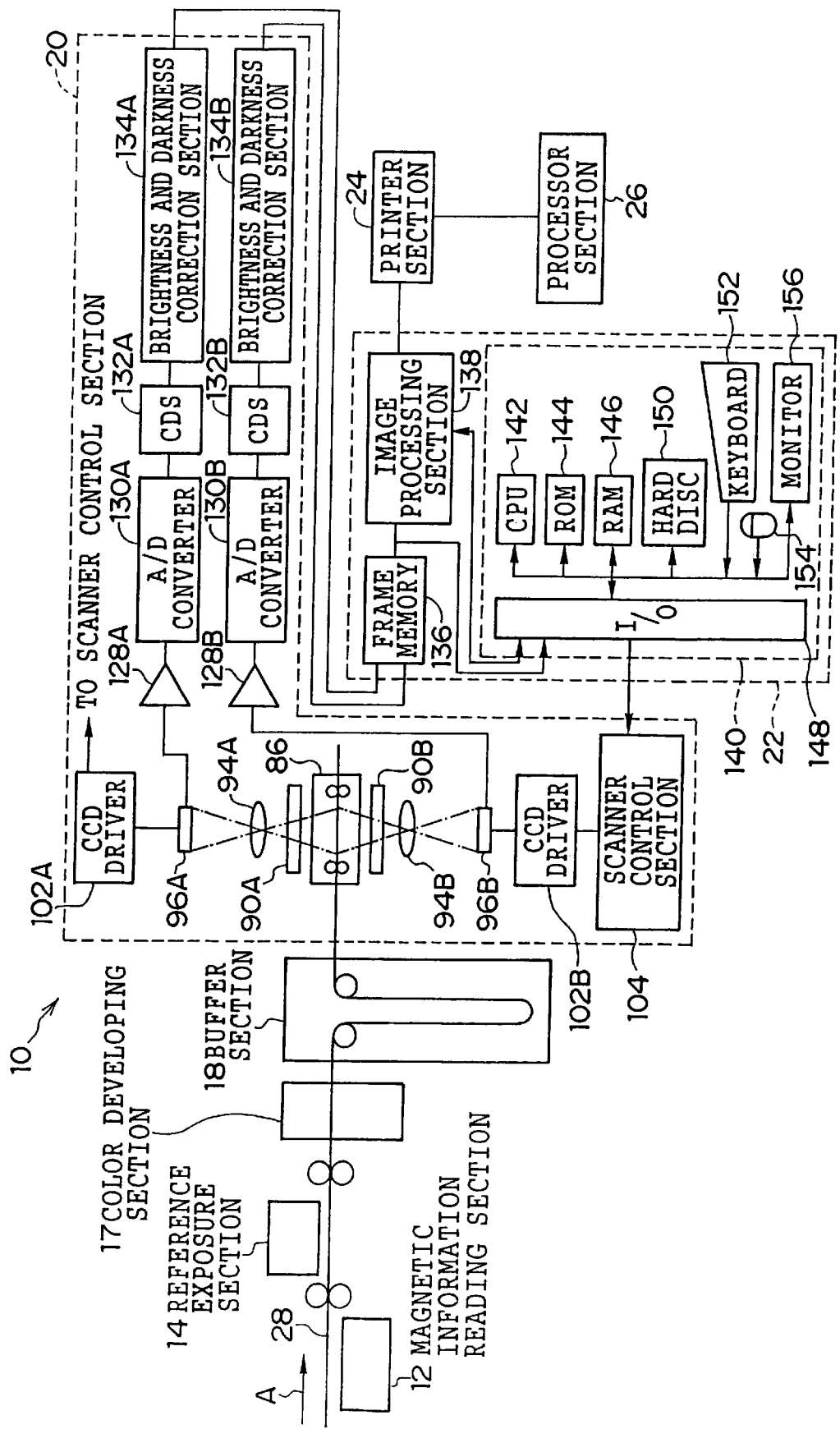
FIG. 28 is an overall structural view of an image processing system according to the third embodiment of the present invention.

FIG. 28 shows the overall structure of the image processing system 10, which has the same configuration as the image processing system 10 according to the first and second embodiments shown in FIG. 1, except that the black and white developing section 16 is replaced by a color developing section 17.

In the color developing section 17, color development is carried out by applying a developer for color development on the photographic film 28. The color developing section has the same structure as the black and white developing section 16 shown in FIG. 8, but uses a developer for color development.

Like the black and white developing section, due to the spray of the developer from the spray tank 62, the photographic film 28 conveyed at a substantially constant speed undergoes color development.

Figure 29A:
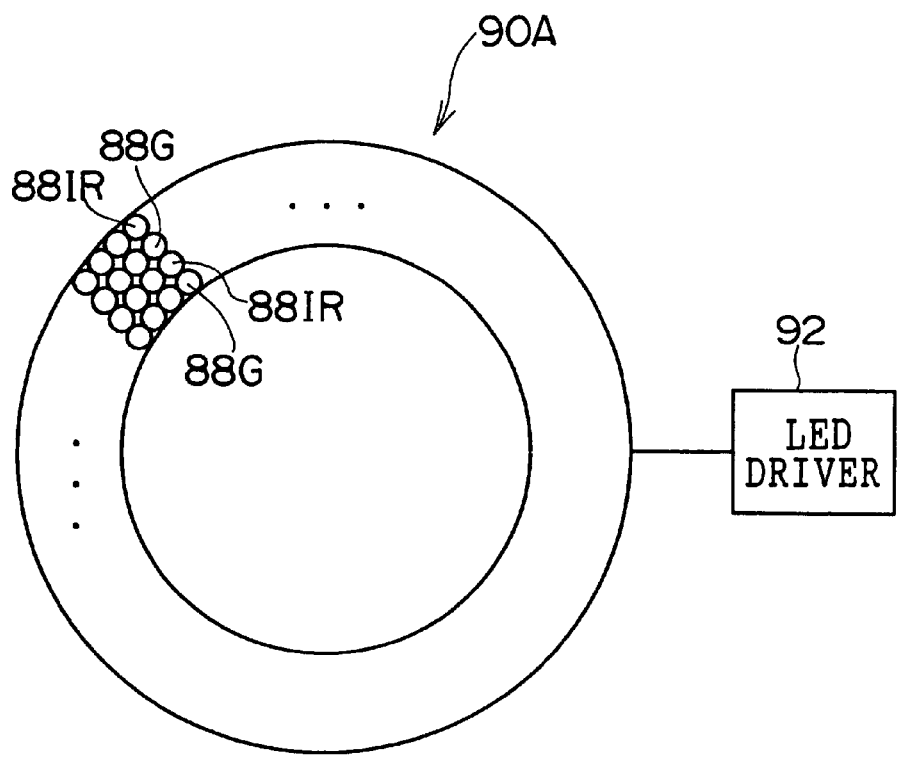
FIG. 29A is a bottom view of an illumination unit according to the third embodiment of the present invention.
Figure 29B:
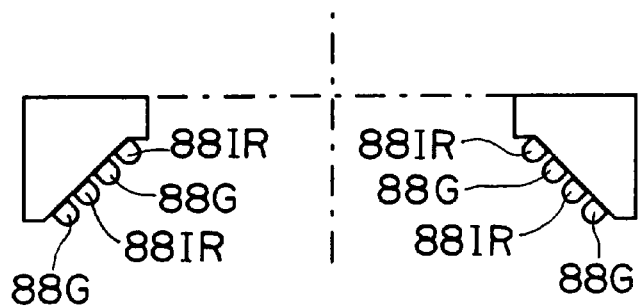
FIG. 29B is a side view of the illumination unit.

As shown in FIG. 29, the illumination unit 90A, which comprises LEDs 88IR and LEDs 88G disposed alternately in a ring-like configuration for irradiating light onto the photographic film 28, is provided above the film carrier 86. The LEDs 88IR emit light of a wavelength in the infrared range (about a 950 nm center wavelength) as shown in FIG. 13 (IR light), and the LEDs 88G emit G light. The illumination unit 90A is driven by the LED driver 92 so as to light the LEDs 88IR, 88G independently. The LEDs 88IR correspond to the first light source of the present invention, and the LEDs 88G correspond to the second light source of the present invention.

The photographic film 28 is conveyed by the film carrier 86 so as to be positioned with the image surface of the image recorded on the photographic film 28 disposed at a position coinciding with the optical axis L (reading position). Moreover, with the image positioned at the reading position, the scanner control section 104 rotates the turret 122, 108 such that the opening portion 124 of the reflection plate 118A for brightness correction and the opening portion 110 of the ND filter 106 for brightness correction are provided on the optical axis L, as well as sets the charge accumulating times t11, t12, t13 of the area CCDs 96A, 96B corresponding to predetermined reading conditions in the CCD drivers 102A, 102B. The area CCDs 96A, 96B carry out, for a set charge accumulating time, photoelectric conversion on the reflected light from the emulsion surface side (B layer side) of the photographic film 28, the reflected light from the base surface side (R layer side), and the transmitted light transmitted through the photographic film 28, and photoelectrically-converted charges are accumulated.

That is, as shown in FIG. 30I, in the case the LEDs 88IR of the illumination unit 90A are lit by the scanner control section 104, the IR light is irradiated to the B layer side of the photographic film 28 so that the light reflected by the B layer of the photographic film 28 is detected by the area CCD 96A as shown in FIG. 30A (more specifically, the photoelectrically converted charge is accumulated). During the charge accumulation, the piezoelectric driver 99A vibrates the piezoelectric elements 101AX, 101AY as shown in FIGS. 30B, 30C so as to move the area CCD 96A in the X1 direction, the Y1 direction, the X2 direction, and the Y2 direction successively as shown in FIG. 24B. The charge accordingly accumulated is read out from the area CCD 96A as a signal representing the reflected light amount as shown in FIG. 30D.

Moreover, at the same time, the piezoelectric driver 99B vibrates the piezoelectric elements 101BX, 101BY as shown in FIGS. 30F, 30G so as to move the area CCD 96B in the X1 direction, the Y1 direction, the X2 direction, and the Y2 direction successively as shown in FIG. 24C. At each movement, the light transmitted through the photographic film 28 is detected by the area CCD 96B as shown in FIG. 17E (specifically, the light is subjected to photoelectric conversion) and is read out from the area CCD 96B as a signal representing the reflected light amount as shown in FIG. 30H.

When the detection of the transmitted light and the reflected light of the B layer is finished and the illumination unit 90B is lit by the scanner control section 104 as shown in FIG. 30J, the IR light is irradiated to the base layer side of the photographic film 28, and the light reflected by the R layer of the photographic film 28 is detected by the area CCD 96B as shown in FIG. 30E (specifically, the light is subjected to photoelectric conversion). During the charge accumulation, the piezoelectric driver 99B vibrates the piezoelectric elements 101BX, 101BY as shown in FIGS. 30F, 30G so as to move the area CCD 96B in the X1 direction, the Y1 direction, the X2 direction, and the Y2 direction successively as shown in FIG. 24B. The charge accordingly accumulated is read out from the area CCD 96B as a signal representing the reflected light amount as shown in FIG. 30H.

When the detection of the B layer reflected light is finished, as shown in FIG. 30I, the LEDs 88G of the illumination unit 90A are lit by the scanner control part 104 so as to irradiate G light to the B layer side of the photographic film so as to carry out transmission light reading by the G light similar to the above-mentioned transmission light reading by the IR light.

In this way, the light reflected by the R layer and the B layer is read out at a low resolution, and the transmitted light by the IR light and the G light is read out at a high resolution.

The light amount of the light irradiated by the illumination units 90A, 90B, the lighting times t24, t25, and the charge accumulating times t21, t22, t23 by the area CCDs 96A, 96B are set optimally by the set up calculation by the control section 140 described later, in accordance with the type of the film or the like.

The reflection light amount by the B layer varies depending on the developed silver amount contained in the B layer (blue-light-photosensitive layer), that is, the silver image amount in the B layer. Therefore, the photoelectric conversion of the light reflected by the B layer corresponds to the operation of reading the image information of an yellow dye image. similarly, since the reflection light amount by the R layer varies depending on the developed silver amount contained in the R layer (red-light-photosensitive layer), that is, the silver image amount in the R layer, the photoelectric conversion of the light reflected by the R layer (red-light-photosensitive layer) corresponds to the operation of reading the image information of a cyan dye image. Moreover, the photoelectric conversion of the transmitted light the G light corresponds to the operation of reading the magenta dye image and the silver image of all of the layers. Furthermore, the photoelectric conversion of the transmitted light the IR light corresponds to the operation of reading the silver image of the total of the layers. Therefore, subtraction of the transmitted image by the IR light from the transmitted image by the G light corresponds to the operation of reading the image information of the magenta dye image in the G layer.

The brightness and darkness correction section 134A stores, as darkness correction data for each cell in an unillustrated memory, data which has been inputted to the brightness and darkness correction section in a state in which the light incident side of the area CCD 96A is shut-off from light by the black shutter 100A (i.e., data expressing the dark output level of each cell of the area CCD 96A). The brightness and darkness correction section 134A carries out darkness correction by subtracting the dark output levels of the cells corresponding to the respective pixels from the inputted image data. The darkness correction data are set, for example, at the time of inspection when the apparatus is initially used, or each time a predetermined amount of time passes, or each time scanning is carried out. However, it is preferable that the darkness correction data are set a frequency which enables corrections for fluctuations in the dark output level. The darkness correction by the brightness and darkness correction section 134B can be executed in the same manner as mentioned above.

Moreover, in a case in which the brightness and darkness correction section 134A carries out brightness correction on the image data of an image recorded on the photographic film 28 which has been subjected to color development, first, the reflected light is read out by the area CCD 96A by using a material with a high reflectance, such as a white plate. Based on the inputted data (the dispersion in density of the respective pixels represented by the data is due to the dispersion in the photoelectric conversion characteristics of the respective cells or non-uniformity of the light source), the gain is determined for each cell and is stored in a memory (not shown) as the brightness correction data. Then, the inputted image data of the frame image which is the object of reading are corrected for each pixel according to the gain determined for each cell. The brightness correction by the brightness and darkness correction part 134B can be executed in the same manner as mentioned above. Furthermore, in the case of the brightness correction by reading out the transmitted light from the illumination unit 90A, the brightness correction is executed in a state in which the light from the illumination unit 90A is directly received by the cells.

Similarly to the first and second embodiments, the conversion characteristics f1, f2 are determined. Furthermore, correction for sharpness enhancement is executed in the same manner as in the second embodiment.

Since the transmission read data by the IR light are the transmission density data of the silver image of the total of the R, G, B layers, and the transmission read data by the G light are the transmission density data of the silver image and the dye image (G image) of the total of the R, G, B layers, given that the transmission density data of the silver image of the total of the R, G, B layers is DTSV and the transmission density data of the silver image and the dye image (G image) in the total of the R, G, B layers is DTRGB, the G transmission density data can be represented by DTG=DTRGB−DTSV. This calculation is executed by the MTX circuit 160. Accordingly, since the G transmission density data DTG comprises only the information of the dye image contained in the G layer, compared with the case of comprising only the silver image contained in the G layer, appropriate color reproduction can be executed with a high accuracy. The MTX circuit 160 corresponds to the calculating means in the present invention.

Similarly to the first and second embodiments, the conversion characteristic f3 is determined. The LUT 162 carries out gray balance correction with the conversion characteristic f3 as the reference for the gradation conversion characteristics, and further executes gradation balance correction by correction carried out by using the light source correction coefficient.

The image data which have been subjected to gray balance correction undergo dodging processing by the automatic dodging section 166. The low frequency component image data subjected to the automatic dodging processing are, by the adding section 167, combined with the high frequency component image data subjected to the sharpness enhancement processing by the sharpness enhancement section 168. The LPF 159, the subtracting section 161, the adding section 167, and the sharpness enhancement section 168 correspond to the generating means according to the present invention.

The image data which have been subjected to image processings in this way are converted to the image data to be displayed on the monitor 154 by the 3D (three-dimensional) LUT color conversion section 170, as well as converted to the image data to be printed on a printing paper in the printer section 24 by the 3D LUT conversion section 172.

Similarly to the first and second embodiments, the operation of the present embodiment will be explained with an example of a case of processing an APS film. Operations which are the same as those of the first and second embodiments are not explained.

The photographic film 28 which has been subjected to color development is conveyed to the film scanner 20 via the buffer section 18. When the reference exposure area 32 is detected by the frame detecting sensor 116, the central portion of the reference exposure area 32 is positioned on the optical axis L.

Next, the scanner control section 104 sets the charge accumulating times t21, t22, t23 for the CCD drivers 102A, 102B, and lights the illumination units 90A, 90B for the lighting times t24, t25 so as to irradiate IR light to the photographic film 28. Accordingly, the reference exposure area 32 is read out by the area CCDs 96A, 96B. That is, the reflected light of the B layer is detected by the area CCD 96A, and the reflected light of the R layer and the transmitted light of each layer are detected by the area CCD 96B.

When the operation of reading the reference exposure area 32 is finished, the image frame 1 is positioned so as to be on the optical axis L, so that the operation of reading the image frame 1 is carried out. That is, the LEDs 88IR of the illumination unit 90A are lit according to the timing as shown in FIG. 30 so that the reflection reading of the photographic film 28 on the base surface side is carried out at a low resolution by the area CCD 96A. At the same time, the transmission reading by the IR light is carried out at a high resolution by the area CCD 96B.

Next, the LEDs 88IR of the illumination unit 90B are lit so that the reflection reading of the photographic film 28 on the base surface side is carried out at a low resolution by the area CCD 96B. Then, the LEDs 88G of the illumination unit 90A are lit so that the transmission reading by the G light of the photographic film 28 is carried out at a high resolution by the area CCD 96B. These reading data are subjected to brightness and darkness processing, or the like and are outputted to the image processing apparatus 22.

Image processings are carried out in the image processing section 138 in the same way as in the second embodiment.

In contrast, the G transmission density data DTG are calculated by the MTX circuit 160 by subtracting the transmission density data DTS of the total of the silver images in the R, G, B layers from the transmission density data DTRGB of the total of the silver images in the R, G, B layers and the dye image (G image). Then, the image data of the low frequency components of the G transmission density data DTG, the R transmission density data DTR and the B transmission density data DTB are subjected to color correction by the color correction coefficient so as to calculate the R, G, B data without color mixing.

Since the G transmission density data DTG comprises only the dye image information contained in the G layer, compared with the case of data comprising only the silver image contained in the G layer, color reproduction can be executed appropriately with high accuracy.

Moreover, with regard to graininess, the image information of the G layer as the intermediate layer is most important. Human eyes are sensitive with respect to the G layer image information. Therefore, the roughness of the final image is influenced greatly by the G layer image information. Therefore, as shown in the following formula (6), since the grains of the R image information and the B image information are added to the G layer image information TG obtained by subtracting the R layer and B layer silver image information TR, TB from the silver image information TRGB of the total of the three layers after the black and white development, the graininess intensifies.

$$TG=TRGB-TR-TB \tag{6}$$

The graininess in this case is represented by the following formula (7).

$$\sigma G2=\sigma RGB2+\sigma R2+\sigma B2 \tag{7}$$

However, the transmission density data DTG of the G layer comprising only the dye image information are obtained in the present invention by subjecting the photographic film 28 to color development, and subtracting the transmission density data DTSV of the total of the silver images in the R G, B layers from the transmission density data DTRGB of the total of the silver images in the R, G, B layers and the dye image (G image). Thus, there is little graininess, which is expressed by the above formula, and an image with little graininess can finally be obtained.

Next, gray balance correction is executed by the LUT 162 with the conversion characteristic f3 as a reference of the gradation conversion characteristics. If necessary, gradation balance correction is executed by using the light source correction coefficient.

The image data which have been subjected to gray balance correction are enlarged or reduced by a predetermined magnification by the enlarging/reducing section 164, and are subjected to dodging processing by the automatic dodging section 166. The low frequency component image data which have been subjected to automatic dodging processing are combined with the high frequency component image data which has been subjected to sharpness enhancement processing by the sharpness enhancement section 168.

The image data which have been subjected to image processings in this manner are converted to image data to be displayed on the monitor 154 by the 3DLUT color conversion section 170, as well as converted to image data to be printed on a printing paper in the printer section 24 by the 3DLUT conversion section 172.

The image data which have undergone image processings are exposed on a printing paper by the printer section 24. The printing paper exposed in accordance with image data is fed to the processor section 26 and is subjected to color developing, bleaching fixing, washing with water, and drying processes. Accordingly, the image exposed and recorded on the printing paper is made visible. The images recorded on the image frames are read out successively, are subjected to image processings, and are printed on a printing paper.

In the case of color developing such as the case described above, the B image density is a high B density due to the inherent absorption of the silver halide remaining in the B layer. Further, the reading load is considered to be lighter in reflection reading than in transmission reading because of the residual yellow filter and the like. Thus, use of the above-described reflection reading is effective in cases in which reading without fixation and bleaching is preferable, in order to achieve a higher speed in the color development.

Although IR light is used for the reflected light detection in the above description, it is possible for at least one of the reflected lights IR lights to not be, such as obtaining the image information related to the cyan dye image and the silver image in the red-light-photosensitive layer by detecting the reflected light using the R light, or obtaining the image information related to the yellow dye image and the silver image in the blue-light-photosensitive layer by detecting the reflected light by using B light.

As heretofore explained, according to the present invention, since the image in formation of the intermediate layer comprises only the dye image information, compared with the information comprising only the silver image, information can be obtained with a high accuracy so that an effect of realizing appropriate color reproduction as well as providing a reduced graininess can be achieved.

What is claimed is:

1. An image processing system for carrying out image processing on an image recorded on a color photographic photosensitive material which has at least three types of photographic photosensitive layers containing blue-light-photosensitive, green-light-photosensitive, and red-light-photosensitive silver halide emulsions on a light transmissible supporting member, and which is processed such that a silver image is generated in the photographic photosensitive layers after exposure of an image, said image processing system comprising:

a light source for irradiating a light to a front side and a back side of the color photographic photosensitive material;

a reading sensor for reading image information by light reflected from the front side and the back side of the color photographic photosensitive material, and light transmitted through the color photographic photosensitive material;

an exposing device for exposing a predetermined unexposed area of the color photographic photosensitive material by each blue, green, and red light;

a calculating device for determining correction conditions for correcting image information of each color on the basis of the lights reflected from the front side and an back side of the color photographic photosensitive material in an area exposed by each color and the light transmitted through the color photographic photosensitive material; and a correcting device for correcting a read image in accordance with the correction conditions.

2. The image processing system according to claim 1, wherein the calculating device determines the correction conditions after converting each reflection density obtained by the lights reflected from the front side and the back side of the color photographic photosensitive material to a transmission density.

3. The image processing system according to claim 1, wherein the correction conditions are conditions for correcting color mixing of respective colors.

4. The image processing system according to claim 1, wherein the exposing device carries out gray exposure on the predetermined unexposed area of the color photographic photosensitive material, the calculating device further determines the correction conditions for correcting gray balance and contrast based on the light reflected from the front side and the back side of the color photographic photosensitive material and the light transmitted through the color photographic photosensitive material, and the correcting device carries out at least one of non-linearity correction of the read image, gray balance correction of the read image, and contrast correction of the read image in accordance with the correction conditions.

5. The image processing system according to claim 1, wherein the calculating device further determines the correction conditions for correcting gray balance based on lights reflected from the front side and the back side of the unexposed area of the color photographic photosensitive material and light transmitted through the unexposed area of the color photographic photosensitive material, and the correcting device or corrects the gray balance of the read image in accordance with by the correction conditions.

6. The image processing system according to claim 1, further comprising a setting device for setting the correction conditions for correcting the read image information.

7. The image processing system according to claim 6, wherein the correction conditions are determined in advance such that a first image recorded on the color photographic photosensitive material, which has been processed such that a silver image has been generated in the photographic photosensitive layers after exposure of the image, coincides with a second image recorded on the color photographic photosensitive material, which has been processed so as to generate a dye image by eliminating the silver image.

8. The image processing system according to claim 6, wherein the setting device sets the correction conditions for each type of color photographic photosensitive material based on a plurality of image information read by the reading sensor.

9. The image processing system according to claim 1, further comprising a storing device for storing the correction conditions for each type of color photographic sensitive material, and a detecting device for detecting the type of the color photographic photosensitive material, wherein the correcting device corrects the read image in accordance with correction conditions stored in the storing device corresponding to the detected type of color photographic photosensitive material.

10. The image processing system according to claim 1, further comprising a setting device for setting reading conditions on the basis of light reflected from the front side and the back side of the unexposed area of the color photographic photosensitive material and light transmitted through the unexposed area of the color photographic photosensitive material.

11. An image processing system for carrying out image processing on an image recorded on a color photographic photosensitive material which has at least three types of photographic photosensitive layers containing blue photosensitive, green photosensitive, and red photosensitive silver halide emulsions on a light transmissible supporting member, and which is processed such that a silver image is generated in the photographic photosensitive layers after exposure of an image, said image processing system comprising:

a light source for irradiating light onto a front side and a back side of the color photographic photosensitive material, and a reading sensor for reading, at a low resolution, reflected image information based on lights reflected from the front side and the back side of the color photographic photosensitive material, and for reading, at a high resolution, image information based on light transmitted through the color photographic photosensitive material.

12. The image processing system according to claim 11, further comprising a generating device for generating image information by extracting high frequency component information from transmitted image information read by the reading sensor, and combining the extracted high frequency component information and reflected image information read by the reading sensor.

13. The image processing system according to claim 12, wherein the generating device further extracts low frequency component information from the reflected image information read by the reading sensor, and combines the extracted low frequency component information and the high frequency component information.

14. The image processing system according to claim 12, wherein the generating device combines the high frequency component information after subjecting the high frequency component information to a sharpness processing.

15. The image processing system according to claim 11, wherein the reading sensor includes a plurality of photoelectric conversion elements for the photoelectric conversion of the reflected light, and the image processing system further comprises a moving device for moving the reading sensor in a predetermined direction during photoelectric conversion by the photoelectric conversion elements.

16. The image processing system according to claim 11, wherein the reading sensor includes a plurality of photoelectric conversion elements for the photoelectric conversion of the reflected light, and combines outputs from adjacent photoelectric conversion elements.

17. The image processing system according to claim 11, wherein the reading sensor comprises a front side low resolution sensor for reading, at a low resolution, reflected image information based on light reflected from the front side of the color photographic photosensitive material; a back side low resolution sensor for reading, at a low resolution, reflected image information based on light reflected from the back side of the color photographic photosensitive material; and a high resolution sensor for reading, at a high resolution, transmitted image information based on light transmitted through the color photographic photosensitive material.

18. The image processing system according to claim 11, wherein the reading sensor comprises a common sensor for reading, at a low resolution reflected image information based on light reflected from one of the front side and the back side of the color photographic photosensitive material, and for reading, at a high resolution, transmitted image information based on light transmitted through the color photographic photosensitive material; and a low resolution sensor for reading, at a low resolution, reflected image information based on a light beam reflected by another of the front side and the back side of the color photographic photosensitive material.

19. An image processing system for carrying out image processing on an image recorded on a color photographic photosensitive material which has at least three types of photographic photosensitive layers containing blue photosensitive, green photosensitive, and red photosensitive silver halide emulsions on a light transmissible supporting member, and which is processed such that an image including a silver image and a dye image is generated in the photographic photosensitive layers after exposure of an image, said image processing system comprising:

a first light source for irradiating infrared light onto the color photographic photosensitive material such that the infrared light is transmitted through the photographic photosensitive layer of an intermediate layer;

a second light source for irradiating, onto the color photographic photosensitive layer, complementary color light of a color complementary to the dye contained in the image in the photographic photosensitive layer of the intermediate layer, such that the complementary color light is transmitted through the intermediate layer;

a reading sensor for reading first transmitted image information based on the infrared light transmitted through the color photographic photosensitive material, as well as second transmitted image information based on the complementary color light transmitted through the color photographic photosensitive material; and a calculating device for obtaining image information of the intermediate layer by calculation using the second transmitted image information and the first transmitted image information.

20. The image processing system according to claim 19, wherein the first light source irradiates infrared light onto a front side and a back side of the color photographic photosensitive material, and the reading sensor reads reflected images of upper and lower photographic photosensitive layers based on infrared light reflected by an emulsion surface side and a supporting member side of the color photographic photosensitive material.

21. The image processing system according to claim 19, wherein the second light source includes:

an upper layer light source for irradiating, onto an upper photographic photosensitive layer, first complementary color light of a color complementary to dye contained in an image of the upper photographic photosensitive layer;

a lower layer light source for irradiating, onto a lower photographic photosensitive layer, second complementary color light of a color complementary to dye contained in an image of the lower photographic photosensitive layer; and an intermediate layer light source for irradiating, onto the color photographic photosensitive material, third complementary color light of a color complementary to coloring matter contained in a silver image of an intermediate photographic photosensitive material layer, such that the third complementary color light is transmitted through the intermediate layer, wherein the image processing system further comprises a reading sensor for reading reflected images of the upper and lower photographic photosensitive layers based on the first complementary color light and the second complementary color light reflected by an emulsion surface side and an supporting member side of the color photographic photosensitive material, and for reading first transmitted image information based on infrared light transmitted through the color photographic photosensitive material, and for reading second transmitted image information based on the third complementary color light transmitted through the color photographic photosensitive material.

* * * * *